United States Patent
Sasamoto et al.

(10) Patent No.: US 11,326,069 B2
(45) Date of Patent: May 10, 2022

(54) FLUORINE-CONTAINING ACTIVE ENERGY RAY CURABLE RESIN, SURFACTANT, ACTIVE ENERGY RAY CURABLE RESIN COMPOSITION, AND CURED FILM

(71) Applicant: DIC Corporation, Tokyo (JP)

(72) Inventors: Shin Sasamoto, Ichihara (JP); Akira Takano, Ichihara (JP)

(73) Assignee: DIC Corporation, Tokyo (JP)

( * ) Notice: Subject to any disclaimer, the term of this patent is extended or adjusted under 35 U.S.C. 154(b) by 298 days.

(21) Appl. No.: 16/472,942

(22) PCT Filed: Dec. 5, 2017

(86) PCT No.: PCT/JP2017/043595
§ 371 (c)(1),
(2) Date: Jun. 24, 2019

(87) PCT Pub. No.: WO2018/123463
PCT Pub. Date: Jul. 5, 2018

(65) Prior Publication Data
US 2019/0359844 A1    Nov. 28, 2019

(30) Foreign Application Priority Data
Dec. 26, 2016  (JP) .............................. JP2016-251157

(51) Int. Cl.
| | |
|---|---|
| *C09D 125/18* | (2006.01) |
| *C09D 7/63* | (2018.01) |
| *C08F 212/34* | (2006.01) |
| *C08K 5/17* | (2006.01) |
| *C09D 4/00* | (2006.01) |

(52) U.S. Cl.
CPC .......... *C09D 125/18* (2013.01); *C08F 212/34* (2013.01); *C08K 5/17* (2013.01); *C09D 4/00* (2013.01); *C09D 7/63* (2018.01)

(58) Field of Classification Search
CPC .......... C09D 125/18; C09D 7/63; C09D 4/00; C08F 212/34; C08K 5/17
USPC ........................................................ 524/606
See application file for complete search history.

(56) References Cited

U.S. PATENT DOCUMENTS

| | | | |
|---|---|---|---|
| 8,030,412 B2 * | 10/2011 | Suzuki | ................. C08G 65/007 |
| | | | 525/326.2 |
| 2011/0118405 A1 * | 5/2011 | Suzuki | ................ C08F 299/065 |
| | | | 524/533 |
| 2013/0012647 A1 * | 1/2013 | Mihara | ................ C09D 175/14 |
| | | | 524/544 |

FOREIGN PATENT DOCUMENTS

| | | |
|---|---|---|
| CN | 102015933 A | 4/2011 |
| CN | 102834421 A | 12/2012 |
| JP | 2002-80547 A | 3/2002 |
| JP | 2002080547 A * | 3/2002 |
| WO | 2009/133770 A1 | 11/2009 |
| WO | 2011/122391 A1 | 10/2011 |

OTHER PUBLICATIONS

International Search Report dated Feb. 20, 2018, issued for PCT/JP2017/043595.
Office Action dated Mar. 30, 2021, issued for Chinese patent application 201780080709.9.

* cited by examiner

*Primary Examiner* — Michael M. Bernshteyn
(74) *Attorney, Agent, or Firm* — Locke Lord LLP; James E. Armstrong, IV; Nicholas J. DiCeglie, Jr.

(57) ABSTRACT

Objects are to provide a fluorine-containing active energy ray curable resin which may be suitably used as a surfactant in an aqueous active energy ray curable resin composition, to provide an active energy ray curable resin composition including the resin, and to provide a cured product obtained by curing the composition. Specifically, a fluorine-containing active energy ray curable resin is provided which includes a polymer structure (a1) derived from a radically polymerizable unsaturated monomer, a poly(perfluoroalkylene ether) chain (a2), a radically polymerizable unsaturated group (a3), and an acid group forming a neutral salt structure (a4). Also provided are a surfactant including the fluorine-containing active energy ray curable resin; an active energy ray curable resin composition including the fluorine-containing active energy ray curable resin, an active energy ray curable hydrophilic resin other than the fluorine-containing active energy ray curable resin, and water; and a cured film of the composition.

15 Claims, No Drawings

FLUORINE-CONTAINING ACTIVE ENERGY RAY CURABLE RESIN, SURFACTANT, ACTIVE ENERGY RAY CURABLE RESIN COMPOSITION, AND CURED FILM

TECHNICAL FIELD

The present invention relates to a fluorine-containing active energy ray curable resin which may be suitably used as a surfactant in an aqueous active energy ray curable resin composition to contribute to enhancing the leveling properties and antifouling properties of cured films obtained from the composition, to an active energy ray curable resin composition including the resin, and to a cured film obtained by curing the composition.

BACKGROUND ART

Surfactants, in particular, fluorosurfactants can impart good leveling properties and antifouling properties to cured films (cured products), and are added to a variety of coating agents. Examples of such coating agents include active energy ray curable resin compositions (organic solvent-based active energy ray curable resin compositions) which contain a polymer with a polymerizable unsaturated double bond such as acryloyl acrylate, or a polymer without an unsaturated double bond such as nonpolymerizable acrylic resin; a polymerizable monomer; and an organic solvent as a diluent. For example, surfactants disclosed for use in such organic solvent-based active energy ray curable resin compositions are those having a polymer structure derived from a radically polymerizable unsaturated monomer, a poly(perfluoroalkylene ether) chain, and a radically polymerizable unsaturated group (see, for example, Patent Literature 1).

When, for example, the above type of organic solvent-based active energy ray curable resin composition is used as a spray paint, the composition needs to contain as much as 50 to 90 mass % of the organic solvent based on the mass of the composition. The organic solvent in the composition volatilizes during the formation of a cured film on the surface of a substrate such as a plastic substrate, thus deteriorating the working environment.

In addition, organic solvents pollute the global environment and the use of organic solvents is being regulated more tightly worldwide. Under such circumstances, aqueous active energy ray curable resin compositions free from organic solvents have been developed and are becoming the mainstream particularly in Europe, U.S. and China. Unfortunately, conventional surfactants have poor solubility or dispersibility in aqueous active energy ray curable resin compositions. If, for example, the surfactant disclosed in Patent Literature 1 is added to an aqueous active energy ray curable resin composition, the surfactant cannot be dissolved or dispersed favorably in the composition and consequently fails to serve as expected.

CITATION LIST

Patent Literature

PTL 1: International Publication No. WO 2011/122391

SUMMARY OF INVENTION

Technical Problem

Objects of the present invention are to provide a fluorine-containing active energy ray curable resin which may be suitably used as a surfactant in an aqueous active energy ray curable resin composition to contribute to enhancing the leveling properties and antifouling properties of cured films obtained from the composition, to provide a surfactant including the fluorine-containing active energy ray curable resin, to provide an active energy ray curable resin composition including the fluorine-containing active energy ray curable resin, and to provide a cured film obtained by curing the composition.

Solution to Problem

After extensive studies, the present inventors have found that a resin which has a poly(perfluoroalkylene ether) chain, a polymerizable unsaturated group, and an acid group forming a neutral salt structure can be added to an aqueous active energy ray curable composition to impart good leveling properties and antifouling properties to obtainable cured films, and is thus useful as a surfactant for use in aqueous active energy ray curable resin compositions. The present inventors have completed the present invention based on this and other findings.

Specifically, the present invention provides a fluorine-containing active energy ray curable resin including a polymer structure (a1) derived from a radically polymerizable unsaturated monomer, a poly(perfluoroalkylene ether) chain (a2), a radically polymerizable unsaturated group (a3), and an acid group forming a neutral salt structure (a4).

Further, the present invention provides a surfactant including a polymer structure (a1) derived from a radically polymerizable unsaturated monomer, a poly(perfluoroalkylene ether) chain (a2), a radically polymerizable unsaturated group (a3), and an acid group forming a neutral salt structure (a4).

Still further, the present invention provides an active energy ray curable resin composition including the fluorine-containing active energy ray curable resin (A) of the invention described above, an active energy ray curable hydrophilic resin (B) other than the fluorine-containing active energy ray curable resin (A), and water.

Furthermore, the present invention provides a cured film of the active energy ray curable resin composition.

Advantageous Effects of Invention

The fluorine-containing active energy ray curable resin provided according to the present invention may be suitably used as a surfactant in an aqueous active energy ray curable resin composition. The active energy ray curable resin composition which contains the fluorine-containing active energy ray curable resin of the present invention can give cured films with excellent leveling properties and antifouling properties in spite of the fact that the medium is based on water, and may be used as a coating material in a variety of applications.

DESCRIPTION OF EMBODIMENTS

A fluorine-containing active energy ray curable resin of the present invention includes a polymer structure (a1) derived from a radically polymerizable unsaturated monomer, a poly(perfluoroalkylene ether) chain (a2), a radically polymerizable unsaturated group (a3), and an acid group forming a neutral salt structure (a4).

Examples of the fluorine-containing active energy ray curable resins include resins having a poly(perfluoroalkylene ether) chain (a2), a radically polymerizable unsaturated group (a3), and an acid group forming a neutral salt structure (a4) as side chains in a polymer structure (a1) derived from a radically polymerizable unsaturated monomer [hereinafter, such resins will be sometimes written as the fluorine-containing active energy ray curable resins (A1)]; and resins in which a plurality of polymer structures (a1) are connected through a poly(perfluoroalkylene ether) chain (a2) and which have a radically polymerizable unsaturated group (a3), and an acid group forming a neutral salt structure (a4) as side chains in the polymer structures (a1) [hereinafter, such resins will be sometimes written as the fluorine-containing active energy ray curable resins (A2)].

The polymer structure (a1) present in the fluorine-containing active energy ray curable resin of the invention is a polymer structure derived from a radically polymerizable unsaturated monomer. Examples of the radically polymerizable unsaturated monomers include (meth)acrylic monomers, aromatic vinyl monomers, vinyl ester monomers and maleimide monomers.

For example, the poly(perfluoroalkylene ether) chain (a2) present in the fluorine-containing active energy ray curable resin of the invention has an alternate structure composed of C1-C3 divalent fluorocarbon groups bonded to one another via an oxygen atom. The chain may contain a single kind of C1-C3 divalent fluorocarbon groups, or a plurality of kinds of such groups. A specific example is one represented by the following structural formula 1.

[Chem. 1]

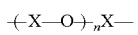   1

(In the structural formula 1, X is any of the structural formulae a to d illustrated below, all the structures X in the structural formula 1 may be identical, a plurality of such structures may be present randomly or may form a block, and n denotes a value of 1 or greater which indicates the number of the repeating units.

[Chem. 2]

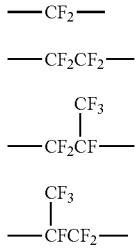

a
b
c
d

In particular, to ensure that a cured film that is obtained will exhibit excellent antifouling properties and will allow dirt to be easily wiped off the surface thereof, the poly (perfluoroalkylene ether) chain preferably includes a perfluoromethylene ether chain that has a perfluoromethylene structure represented by the structural formula a, and also a perfluoroethylene ether chain that has a perfluoroethylene structure represented by the structural formula b. The molar ratio (structures a/structures b) of the perfluoromethylene structures represented by the structural formula a to the perfluoroethylene structures represented by the structural formula b is preferably 1/10 to 10/1. This ratio advantageously ensures that a cured film that is obtained will exhibit excellent antifouling properties. The value n in the structural formula 1 is preferably in the range of 3 to 100, more preferably 6 to 70, and still more preferably in the range of 12 to 50.

To ensure that a cured film that is obtained will exhibit excellent antifouling properties, the poly(perfluoroalkylene ether) chain (a2) is preferably such that the total number of fluorine atoms in a single poly(perfluoroalkylene ether) chain (a2) is in the range of 18 to 200, and particularly preferably in the range of 25 to 150.

To ensure that the fluorine-containing active energy ray curable resin of the invention will attain good compatibility with an active energy ray curable hydrophilic resin (B) described later and that cured films with excellent antifouling properties will be obtained, the content of fluorine atoms in the fluorine-containing active energy ray curable resin is preferably 3 to 40 mass %, and more preferably 5 to 30 mass %.

The fluorine-containing active energy ray curable resin of the invention is preferably such that the polymer structure (a1) and the poly(perfluoroalkylene ether) chain (a2) are connected to each other via a structure derived from a styryl group. Such a fluorine-containing active energy ray curable resin advantageously gives cured films having excellent water resistance.

Examples of the radically polymerizable unsaturated groups (a3) present in the fluorine-containing active energy ray curable resin of the invention include those represented by the following structural formulae (U-1) to (U-5).

[Chem. 3]

   (U-1)

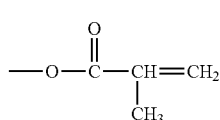   (U-2)

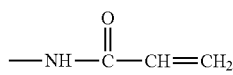   (U-3)

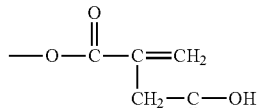   (U-4)

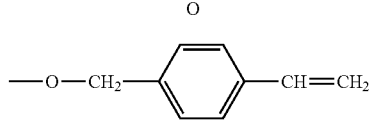   (U-5)

Of the radically polymerizable unsaturated groups (a3), one represented by the formula (U-1) is preferable for the reason that the fluorine-containing active energy ray curable resin that is obtained can give cured films with excellent curability.

To ensure that the poly(perfluoroalkylene ether) chains will be strongly anchored to cured films and thereby to ensure that the cured films will attain higher antifouling properties, the content of the radically polymerizable unsaturated groups (a3) in the fluorine-containing active energy ray curable resin of the invention is preferably 0.5 to 3.5 mmol/g, and more preferably 1.0 to 3.0 mmol/g.

Examples of the acid groups which form a neutral salt structure (a4) in the fluorine-containing active energy ray curable resin of the invention include sulfonic group, carboxyl group and phosphoric group.

Examples of the acid groups forming a neutral salt structure include the above acid groups forming an amine salt structure, and the above acid groups forming an inorganic salt structure.

Examples of the amine salt structures formed of the above acid groups include ammonium salt structures of the above acid groups, primary amine salt structures of the above acid groups, secondary amine salt structures of the above acid groups, and tertiary amine salt structures of the above acid groups.

Examples of the primary amine salt structures include primary monoamine salt structures such as ethylamine salt structure, n-propylamine salt structure, sec-propylamine salt structure, n-butylamine salt structure, sec-butylamine salt structure, i-butylamine salt structure, tert-butylamine salt structure, pentylamine salt structure, hexylamine salt structure, heptylamine salt structure, octylamine salt structure, decylamine salt structure, laurylamine salt structure, myristylamine salt structure, 1,2-dimethylhexylamine salt structure, 3-pentylamine salt structure, 2-ethylhexylamine salt structure, allylamine salt structure, aminoethanol salt structure, 1-aminopropanol salt structure, 2-aminopropanol salt structure, aminobutanol salt structure, aminopentanol salt structure, aminohexanol salt structure, 3-ethoxypropylamine salt structure, 3-propoxypropylamine salt structure, 3-isopropoxypropylamine salt structure, 3-butoxypropylamine salt structure, 3-isobutoxypropylamine salt structure, 3-(2-ethylhexyloxy)propylamine salt structure, aminocyclopentane salt structure, aminocyclohexane salt structure, aminonorbornene salt structure, aminomethylcyclohexane salt structure, aminobenzene salt structure, benzylamine salt structure, phenethylamine salt structure, α-phenylethylamine salt structure, naphthylamine salt structure and furfurylamine salt structure; and primary polyamine salt structures such as ethylenediamine salt structure, 1,2-diaminopropane salt structure, 1,3-diaminopropane salt structure, 1,2-diaminobutane salt structure, 1,3-diaminobutane salt structure, 1,4-diaminobutane salt structure, 1,5-diaminopentane salt structure, 1,6-diaminohexane salt structure, 1,7-diaminoheptane salt structure, 1,8-diaminooctane salt structure, dimethylaminopropylamine salt structure, diethylaminopropylamine salt structure, bis-(3-aminopropyl) ether salt structure, 1,2-bis-(3-aminopropoxy)ethane salt structure, 1,3-bis-(3-aminopropoxy)-2,2'-dimethylpropane salt structure, aminoethylethanolamine salt structure, 1,2-bisaminocyclohexane salt structure, 1,3-bisaminocyclohexane salt structure, 1,4-bisaminocyclohexane salt structure, 1,3-bisaminomethylcyclohexane salt structure, 1,4-bisaminomethylcyclohexane salt structure, 1,3-bisaminoethylcyclohexane salt structure, 1,4-bisaminoethylcyclohexane salt structure, 1,3-bisaminopropylcyclohexane salt structure, 1,4-bisaminopropylcyclohexane salt structure, hydrogenated 4,4'-diaminodiphenylmethane salt structure, 2-aminopiperidine salt structure, 4-aminopiperidine, 2-aminomethylpiperidine salt structure, 4-aminomethylpiperidine salt structure, 2-aminoethylpiperidine salt structure, 4-aminoethylpiperidine salt structure, N-aminoethylpiperidine salt structure, N-aminopropylpiperidine salt structure, N-aminoethylmorpholine salt structure, N-aminopropylmorpholine salt structure, isophoronediamine salt structure, menthanediamine salt structure, 1,4-bisaminopropylpiperazine salt structure, o-phenylenediamine salt structure, m-phenylenediamine salt structure, p-phenylenediamine salt structure, 2,4-tolylenediamine salt structure, 2,6-tolylenediamine salt structure, 2,4-toluenediamine salt structure, m-aminobenzylamine salt structure, 4-chloro-o-phenylenediamine salt structure, tetrachloro-p-xylylenediamine salt structure, 4-methoxy-6-methyl-m-phenylenediamine salt structure, m-xylylenediamine salt structure, p-xylylenediamine salt structure, 1,5-naphthalenediamine salt structure, 2,6-naphthalenediamine salt structure, benzidine salt structure, 4,4'-bis(o-toluidine) salt structure, dianisidine salt structure, 4,4'-diaminodiphenylmethane salt structure, 2,2-(4,4'-diaminodiphenyl)propane salt structure, 4,4'-diaminodiphenyl ether salt structure, 4,4'-thiodianiline salt structure, 4,4'-diaminodiphenylsulfone salt structure, 4,4'-diaminoditolylsulfone salt structure, methylenebis(o-chloroaniline) salt structure, 3,9-bis(3-aminopropyl) 2,4,8,10-tetraoxaspiro[5,5]undecane salt structure, diethylenetriamine salt structure, iminobispropylamine salt structure, methyliminobispropylamine salt structure, bis(hexamethylene)triamine salt structure, triethylenetetramine salt structure, tetraethylenepentamine salt structure, pentaethylenehexamine salt structure, N-aminoethylpiperazine salt structure, N-aminopropylpiperazine salt structure, 1,4-bis(aminoethylpiperazine) salt structure, 1,4-bis(aminopropylpiperazine) salt structure, 2,6-diaminopyridine salt structure, and bis(3,4-diaminophenyl) sulfone salt structure.

Examples of the secondary amine salt structures include secondary monoamine salt structures such as diethylamine salt structure, dipropylamine salt structure, di-n-butylamine salt structure, di-sec-butylamine salt structure, diisobutylamine salt structure, di-n-pentylamine salt structure, di-3-pentylamine salt structure, dihexylamine salt structure, dioctylamine salt structure, di(2-ethylhexyl)amine salt structure, methylhexylamine salt structure, diallylamine salt structure, pyrrolidine salt structure, piperidine salt structure, 2,4-lupetidine salt structure, 2,6-lupetidine salt structure, 3,5-lupetidine salt structure, diphenylamine salt structure, N-methylaniline salt structure, N-ethylaniline salt structure, dibenzylamine salt structure, methylbenzylamine salt structure, dinaphthylamine salt structure, pyrrole salt structure, indoline salt structure, indole salt structure and morpholine salt structure; and secondary polyamine salt structures such as N,N'-dimethylethylenediamine salt structure, N,N'-dimethyl-1,2-diaminopropane salt structure, N,N'-dimethyl-1,3-diaminopropane salt structure, N,N'-dimethyl-1,2-diaminobutane salt structure, N,N'-dimethyl-1,3-diaminobutane salt structure, N,N'-dimethyl-1,4-diaminobutane salt structure, N,N'-dimethyl-1,5-diaminopentane salt structure, N,N'-dimethyl-1,6-diaminohexane salt structure, N,N'-dimethyl-1,7-diaminoheptane salt structure, N,N'-diethylethylenediamine salt structure, N,N'-diethyl-1,2-diaminopropane salt structure, N,N'-diethyl-1,3-diaminopropane salt structure, N,N'-diethyl-1,2-diaminobutane salt structure, N,N'-diethyl-1,3-diaminobutane salt structure, N,N'-diethyl-1,4-diaminobutane salt structure, N,N'-diethyl-1,6-diaminohexane salt structure, piperazine salt structure, 2-methylpiperazine salt structure, 2,5-dimethylpiperazine salt structure, 2,6-dimethylpiperazine salt structure, homopiperazine salt structure, 1,1-di-(4-piperidyl)methane salt structure, 1,2-di-(4-piperidyl)ethane salt structure, 1,3-di-(4-piperidyl)propane salt structure and 1,4-di-(4-piperidyl)butane salt structure.

Examples of the tertiary amine salt structures include tertiary monoamine salt structures such as trimethylamine salt structure, triethylamine salt structure, tri-n-propylamine salt structure, tri-iso-propylamine salt structure, tri-1,2-dimethylpropylamine salt structure, tri-3-methoxypropylamine salt structure, tri-n-butylamine salt structure, tri-iso-butylamine salt structure, tri-sec-butylamine salt structure, tri-pentylamine salt structure, tri-3-pentylamine salt structure, tri-n-hexylamine salt structure, tri-n-octylamine salt structure, tri-2-ethylhexylamine salt structure, tri-dodecylamine salt structure, tri-laurylamine salt structure, dicyclohexylethylamine salt structure, cyclohexyldiethylamine salt structure, tri-cyclohexylamine salt structure, N,N-dimethylhexylamine salt structure, N-methyldihexylamine salt structure, N,N-dimethylcyclohexylamine salt structure, N-methyldicyclohexylamine salt structure, N,N-diethylethanolamine salt structure, N,N-dimethylethanolamine salt structure, N-ethyldiethanolamine salt structure, triethanolamine salt structure, tribenzylamine salt structure, N,N-dimethylbenzylamine salt structure, diethylbenzylamine salt structure, triphenylamine salt structure, N,N-dimethylamino-p-cresol salt structure, N,N-dimethylaminomethylphenol salt structure, 2-(N,N-dimethylaminomethyl)phenol salt structure, N,N-dimethylaniline salt structure, N,N-diethylaniline salt structure, pyridine salt structure, quinoline salt structure, N-methylmorpholine salt structure, N-methylpiperidine salt structure, 2-(2-dimethylaminoethoxy)-4-methyl-1,3,2-dioxaborinane salt structure, and 2-, 3-, and 4-picoline salt structures; and tertiary polyamine salt structures such as tetramethylethylenediamine salt structure, pyrazine salt structure, N,N'-dimethylpiperazine salt structure, N,N'-bis((2-hydroxy)propyl)piperazine salt structure, hexamethylenetetramine salt structure, N,N,N',N'-tetramethyl-1,3-butanamine salt structure, 2-dimethylamino-2-hydroxypropane salt structure, diethylaminoethanol salt structure, N,N,N-tris(3-dimethylaminopropyl)amine salt structure, 2,4,6-tris(N,N-dimethylaminomethyl)phenol salt structure and heptamethylisobiguanide salt structure.

Examples of the inorganic salt structures formed of the above acid groups include sodium hydroxide (NaOH) salt structures and potassium hydroxide (KOH) salt structures.

Of the acid groups forming a neutral salt structure (a4), acid groups forming an amine salt structure are preferable for the reason that the fluorine-containing active energy ray curable resin that is obtained exhibits excellent compatibility with an active energy ray curable hydrophilic resin (B) used in an active energy ray curable resin composition of the invention described later. Of the acid groups forming an amine salt structure, carboxyl groups forming an amine salt structure are preferable, and carboxyl groups forming a salt structure with a tertiary amine are more preferable. Of the tertiary amines that form a salt structure with a carboxyl group, N,N-dimethylethanolamine is preferable. That is, the salt structure formed between a carboxyl group and N,N-dimethylethanolamine is more preferable.

Of the fluorine-containing active energy ray curable resins of the present invention, those having an oxyalkylene chain as a side chain are preferable because such a resin exhibits good solubility or dispersibility in an aqueous active energy ray curable resin composition of the present invention, and cured films with excellent leveling properties can be obtained.

Examples of the oxyalkylene groups include oxyethylene chain, oxypropylene chain and oxybutylene chain. Of the oxyalkylene chains, oxyethylene chain is preferable because the fluorine-containing active energy ray curable resin that is obtained exhibits good solubility or dispersibility in an aqueous active energy ray curable resin composition of the present invention.

When the fluorine-containing active energy ray curable resin of the invention contains oxyalkylene chains, the content thereof is preferably 10 to 70 parts by mass, and more preferably 20 to 60 parts by mass based on 100 parts by mass of the fluorine-containing active energy ray curable resin.

The fluorine-containing active energy ray curable resins (A1) and the fluorine-containing active energy ray curable resins (A2), which are examples of the fluorine-containing active energy ray curable resins of the present invention, may be produced using, for example, monomers (x-1) to (x-6) and a base compound (x-7) described later. Specifically, for example, the fluorine-containing active energy ray curable resin (A1) may be produced by the following methods.

Method (A1-1)

A radically polymerizable unsaturated monomer (x-1) having a poly(perfluoroalkylene ether) chain (a2) and one radically polymerizable unsaturated group is copolymerized with a radically polymerizable unsaturated monomer (x-3) having an acid group. A copolymer (P1-1) is thus obtained which has a polymer structure (a1) derived from the radically polymerizable unsaturated monomers, and contains the poly(perfluoroalkylene ether) chains (a2) and the acid groups as side chains of the polymer structure.

Part of the acid groups present in the copolymer (P1-1) are reacted with a radically polymerizable unsaturated monomer (x-4) having a functional group capable of reacting with the acid group. A copolymer (P2-1) (a fluorine-containing active energy ray curable resin) is thus obtained which has the polymer structure (a1) and contains the poly(perfluoroalkylene ether) chains (a2), the radically polymerizable unsaturated groups (a3) and the acid groups as side chains of the polymer structure.

Thereafter, the residual acid groups in the copolymer (P2-1) are reacted with a base compound (x-7). A fluorine-containing active energy ray curable resin (A1) is thus obtained.

Method (A1-2)

A radically polymerizable unsaturated monomer (x-1) having a poly(perfluoroalkylene ether) chain (a2) and one radically polymerizable unsaturated group is copolymerized with a radically polymerizable unsaturated monomer (x-3) having an acid group, and also a radically polymerizable unsaturated monomer (x-5) having a hydroxyl, isocyanate or glycidyl group. A copolymer (P1-2) is thus obtained which has a polymer structure (a1) derived from the radically polymerizable unsaturated monomers, and contains the poly(perfluoroalkylene ether) chains (a2), the acid groups and the hydroxyl, isocyanate or glycidyl groups as side chains of the polymer structure.

The hydroxyl, isocyanate or glycidyl groups present in the copolymer (P1-2) are reacted with a radically polymerizable unsaturated monomer (x-6) having a functional group capable of reacting with these groups. A copolymer (P2-2) (a fluorine-containing active energy ray curable resin) is thus obtained which has the polymer structure (a1) and contains the poly(perfluoroalkylene ether) chains (a2), the radically polymerizable unsaturated groups (a3) and the acid groups as side chains of the polymer structure.

Thereafter, the acid groups present in the copolymer (P2-2) are reacted with a base compound (x-7). A fluorine-containing active energy ray curable resin (A1) is thus obtained.

For example, the fluorine-containing active energy ray curable resin (A2) may be produced by the following methods.

Method (A2-1)

A radically polymerizable unsaturated monomer (x-2) having a poly(perfluoroalkylene ether) chain (a2) and radically polymerizable unsaturated groups at both ends of the chain is copolymerized with a radically polymerizable unsaturated monomer (x-3) having an acid group. A copolymer (P1-3) is thus obtained which has a plurality of polymer structures (a1) connected through the poly(perfluoroalkylene ether) chain (a2) and contains the acid groups as side chains of the polymer structures (a1).

Part of the acid groups present in the copolymer (P1-3) are reacted with a radically polymerizable unsaturated monomer (x-4) having a functional group capable of reacting with the acid group. A copolymer (P2-3) (a fluorine-containing active energy ray curable resin) is thus obtained in which the polymer structures (a1) are connected through the poly (perfluoroalkylene ether) chain (a2) and which contains the radically polymerizable unsaturated groups (a3) and the acid groups as side chains of the polymer structures (a1).

Thereafter, the residual acid groups in the copolymer (P2-3) are reacted with a base compound (x-7). A fluorine-containing active energy ray curable resin (A2) is thus obtained.

Method (A2-2)

A radically polymerizable unsaturated monomer (x-2) having a poly(perfluoroalkylene ether) chain (a2) and radically polymerizable unsaturated groups at both ends of the chain is copolymerized with a radically polymerizable unsaturated monomer (x-3) having an acid group, and also a radically polymerizable unsaturated monomer (x-5) having a hydroxyl, isocyanate or glycidyl group. A copolymer (P1-4) is thus obtained which has a plurality of polymer structures (a1) connected through the poly(perfluoroalkylene ether) chain (a2) and contains the acid groups and the hydroxyl, isocyanate or glycidyl groups as side chains of the polymer structures (a1).

The hydroxyl, isocyanate or glycidyl groups present in the copolymer (P1-4) are reacted with a radically polymerizable unsaturated monomer (x-6) having a functional group capable of reacting with these groups. A copolymer (P2-4) (a fluorine-containing active energy ray curable resin) is thus obtained which has the polymer structures (a1) connected through the poly(perfluoroalkylene ether) chain (a2) and contains the acid groups and the radically polymerizable unsaturated groups (a3) as side chains of the polymer structures (a1).

Thereafter, the acid groups present in the copolymer (P2-4) are reacted with a base compound (x-7). A fluorine-containing active energy ray curable resin (A2) is thus obtained.

Examples of the radically polymerizable unsaturated monomers (x-1) having a poly(perfluoroalkylene ether) chain (a2) and one radically polymerizable unsaturated group include monomers represented by the following structural formulae (x-1-1) to (x-1-13).

[Chem. 4]

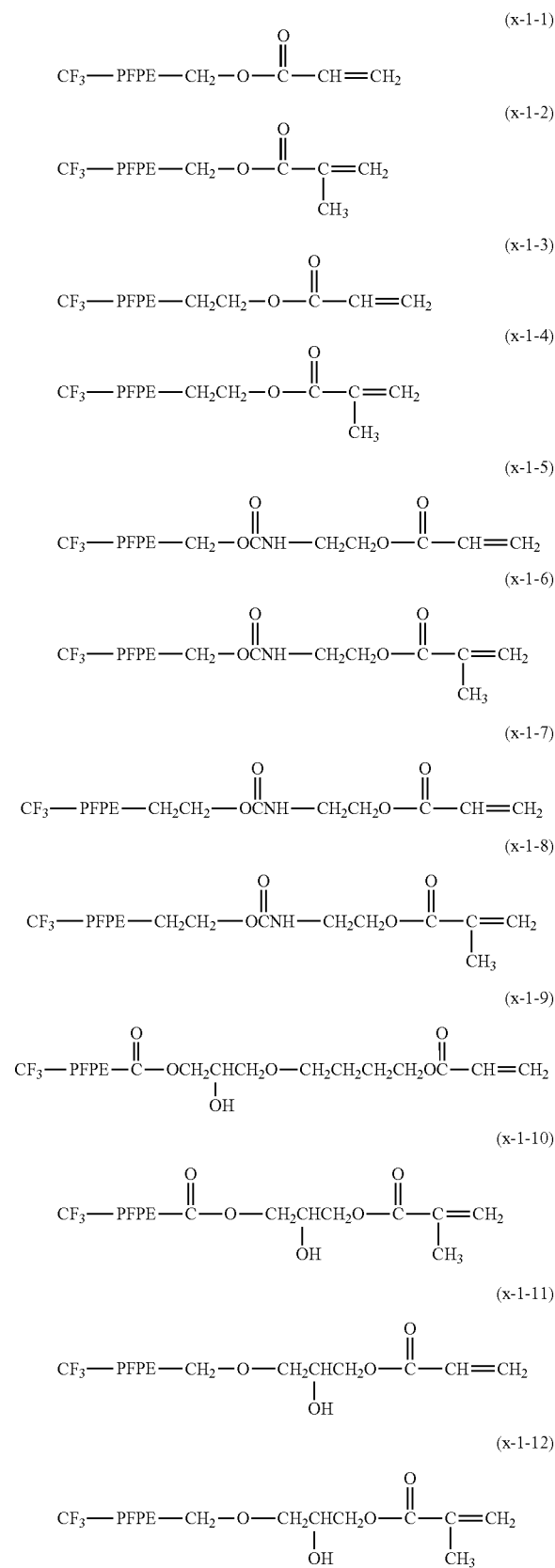

(x-1-13)

$CF_3$—PFPE—$CH_2$—O—$CH_2$—⌬—CH=$CH_2$

The radically polymerizable unsaturated monomers (x-1) having a poly(perfluoroalkylene ether) chain (a2) and one radically polymerizable unsaturated group may be used singly, or two or more may be used in combination. In the present invention, "—PFPE-" indicates a poly(perfluoroalkylene ether) chain (a2).

For example, the radically polymerizable unsaturated monomer (x-1) having a poly(perfluoroalkylene ether) chain (a2) and one radically polymerizable unsaturated group may be produced in such a manner that: a compound having one hydroxyl group at one end of a poly(perfluoroalkylene ether) chain is caused to undergo dehydrochlorination reaction with (meth)acryloyl chloride or chloromethylstyrene, dehydration reaction with (meth)acrylic acid, urethane-forming reaction with 2-(meth)acryloyloxyethyl isocyanate, or esterification reaction with itaconic anhydride;

that a compound having one carboxyl group at one end of a poly(perfluoroalkylene ether) chain is caused to undergo esterification reaction with 4-hydroxybutyl acrylate glycidyl ether, or esterification reaction with glycidyl methacrylate;

that a compound having one isocyanate group at one end of a poly(perfluoroalkylene ether) chain is caused to undergo reaction with 2-hydroxyethyl acrylamide, reaction with 2-hydroxyethyl acrylate, reaction with 2-hydroxypropyl acrylate, or reaction with 4-hydroxybutyl acrylate; or that a compound having one epoxy group at one end of a poly(perfluoroalkylene ether) chain is caused to undergo reaction with (meth)acrylic acid.

Examples of the compounds having one hydroxyl group at one end of a poly(perfluoroalkylene ether) chain, the compounds having one carboxyl group at one end of a poly(perfluoroalkylene ether) chain, the compounds having one isocyanate group at one end of a poly(perfluoroalkylene ether) chain, and the compounds having one epoxy group at one end of a poly(perfluoroalkylene ether) chain include those compounds having the following structures.

[Chem. 5]

$CF_3$—PFPE—$CH_2$—OH  (α-1)

$CF_3$—PFPE—$CH_2CH_2$—OH  (α-2)

$CF_3$—PFPE—C(=O)—OH  (α-3)

$CF_3$—PFPE—$CH_2$—C(=O)—OH  (α-4)

$CF_3$—PFPE—NCO  (α-5)

$CF_3$—PFPE—$CH_2$—O—$CH_2$—CH–$CH_2$ (with epoxide O)  (α-6)

In the present invention, the term "(meth)acrylate" means either or both of methacrylate and acrylate, the term "(meth)acryloyl group" means either or both of methacryloyl group and acryloyl group, and the term "(meth)acrylic acid" means either or both of methacrylic acid and acrylic acid.

Examples of the radically polymerizable unsaturated monomers (x-2) having a poly(perfluoroalkylene ether) chain (a2) and radically polymerizable unsaturated groups at both ends of the chain include monomers represented by the following structural formulae (x-2-1) to (x-2-13).

[Chem. 6]

(x-2-1)
$CH_2$=CH—C(=O)—O—$CH_2$—PFPE—$CH_2$—O—C(=O)—CH=$CH_2$ (x-2-2)
$CH_2$=C($CH_3$)—C(=O)—O—$CH_2$—PFPE—$CH_2$—O—C(=O)—C($CH_3$)=$CH_2$ (x-2-3)
$CH_2$=CH—C(=O)—O—$CH_2CH_2$—PFPE—$CH_2CH_2$—O—C(=O)—CH=$CH_2$ (x-2-4)
$CH_2$=C($CH_3$)—C(=O)—O—$CH_2CH_2$—PFPE—$CH_2CH_2$—O—C(=O)—C($CH_3$)=$CH_2$ (x-2-5)
$CH_2$=CH—C(=O)—$OCH_2CH_2$—NHCO—$CH_2$—PFPE—$CH_2$—OCNH—$CH_2CH_2$O—C(=O)—CH=$CH_2$ (x-2-6)
$CH_2$=C($CH_3$)—C(=O)—$OCH_2CH_2$—NHCO—$CH_2$—PFPE—$CH_2$—OCNH—$CH_2CH_2$O—C(=O)—C($CH_3$)=$CH_2$ (x-2-7)
$CH_2$=CH—C(=O)—$OCH_2CH_2$—NHCO—$CH_2CH_2$—PFPE—$CH_2CH_2$—OCNH—$CH_2CH_2$O—C(=O)—CH=$CH_2$

-continued

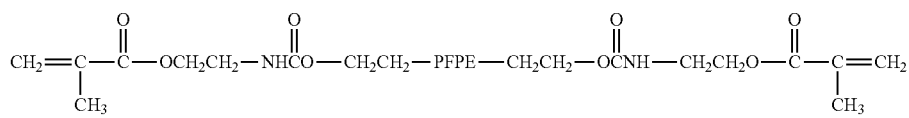
(x-2-8)

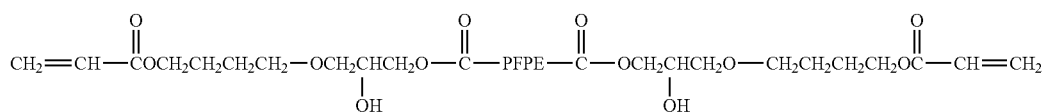
(x-2-9)

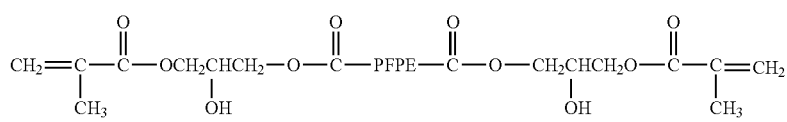
(x-2-10)

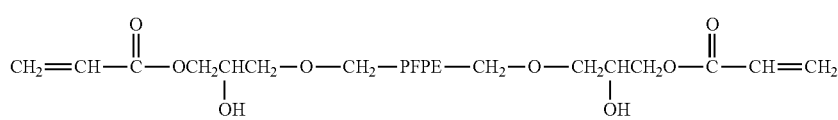
(x-2-11)

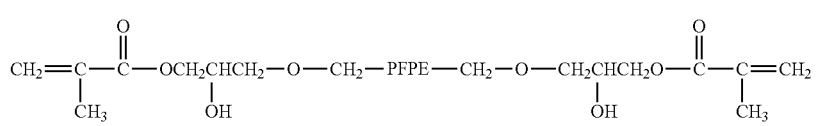
(x-2-12)

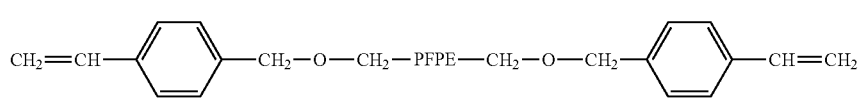
(x-2-13)

Of the above radically polymerizable unsaturated monomers (x-2) having a poly(perfluoroalkylene ether) chain (a2) and radically polymerizable unsaturated groups at both ends of the chain, those represented by the structural formulae (x-2-1), (x-2-2), (x-2-5) and (x-2-6) are preferable because the industrial production of such monomers is easy. Further, those represented by the structural formulae (x-2-2), (x-2-4), (x-2-12) and (x-2-13) are preferable because enhanced chemical resistance is obtained. The monomer represented by (x-2-13) is preferable for the reason that the fluorine-containing active energy ray curable resin that is obtained can give cured films having excellent water resistance. The radically polymerizable unsaturated monomers (x-2) having a poly(perfluoroalkylene ether) chain (a2) and radically polymerizable unsaturated groups at both ends of the chain may be used singly, or two or more may be used in combination.

For example, the radically polymerizable unsaturated monomer (x-2) having a poly(perfluoroalkylene ether) chain (a2) and radically polymerizable unsaturated groups at both ends of the chain may be produced in such a manner that: a compound having one hydroxyl group at both ends of a poly(perfluoroalkylene ether) chain is caused to undergo dehydrochlorination reaction with (meth)acryloyl chloride or chloromethylstyrene, dehydration reaction with (meth)acrylic acid, urethane-forming reaction with 2-(meth)acryloyloxyethyl isocyanate, or esterification reaction with itaconic anhydride;

that a compound having one carboxyl group at both ends of a poly(perfluoroalkylene ether) chain is caused to undergo esterification reaction with 4-hydroxybutyl acrylate glycidyl ether, or esterification reaction with glycidyl methacrylate;

that a compound having one isocyanate group at both ends of a poly(perfluoroalkylene ether) chain is caused to undergo reaction with 2-hydroxyethyl acrylamide; or that a compound having one epoxy group at both ends of a poly(perfluoroalkylene ether) chain is caused to undergo reaction with (meth)acrylic acid. Of these methods, easy reaction is taken advantage of when the production is performed by causing a compound having one hydroxyl group at both ends of a poly(perfluoroalkylene ether) chain to undergo dehydrochlorination reaction with (meth)acryloyl chloride or chloromethylstyrene, or to undergo urethane-forming reaction with 2-(meth)acryloyloxyethyl isocyanate.

Examples of the compounds having one hydroxyl group at both ends of a poly(perfluoroalkylene ether) chain, the compounds having one carboxyl group at both ends of a poly(perfluoroalkylene ether) chain, the compounds having one isocyanate group at both ends of a poly(perfluoroalkylene ether) chain, and the compounds having one epoxy group at both ends of a poly(perfluoroalkylene ether) chain include those compounds having the following structures.

[Chem. 7]

(β-1)

(β-2)

(β-3)

(β-4)

(β-5)

(β-6)

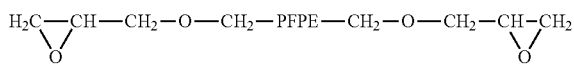

In the method (A1-1) and the method (A1-2), the radically polymerizable unsaturated monomer (x-1) may be used in combination with a radically polymerizable unsaturated monomer (x-2). In the method (A2-1) and the method (A2-2), the radically polymerizable unsaturated monomer (x-2) may be used in combination with a radically polymerizable unsaturated monomer (x-1).

Examples of the radically polymerizable unsaturated monomers (x-3) having an acid group include radically polymerizable unsaturated monomers having a carboxyl group, radically polymerizable unsaturated monomers having a sulfonic group, and radically polymerizable unsaturated monomers having a phosphoric group.

Examples of the radically polymerizable unsaturated monomers having a carboxyl group include (meth)acrylic acid, 2-(meth)acryloyloxyethylsuccinic acid, 2-(meth)acryloyloxyethylphthalic acid, itaconic acid, and carboxylic anhydrides having an unsaturated double bond such as maleic anhydride and itaconic anhydride.

Examples of the radically polymerizable unsaturated monomers having a sulfonic group include acrylamide t-butyl sulfonic acid, and styrenesulfonic acid derivatives.

Examples of the radically polymerizable unsaturated monomers having a phosphoric group include acid phosphoxyethyl methacrylate, acid phosphoxypolyoxyethylene glycol monomethacrylate, and acid phosphoxypolyoxypropylene glycol monomethacrylate.

The radically polymerizable unsaturated monomers (x-3) having an acid group may be used singly, or two or more may be used in combination.

Examples of the radically polymerizable unsaturated monomers (x-4) having a functional group capable of reacting with an acid group include radically polymerizable unsaturated monomers having a glycidyl group, and radically polymerizable unsaturated monomers having a hydroxyl group. Examples of the radically polymerizable unsaturated monomers having a glycidyl group include glycidyl methacrylate and 4-hydroxybutyl acrylate glycidyl ether.

Examples of the radically polymerizable unsaturated monomers having a hydroxyl group include 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 1,4-cyclohexanedimethanol mono(meth)acrylate, N-(2-hydroxyethyl) (meth)acrylamide, glycerol mono(meth)acrylate, polyethylene glycol mono (meth)acrylate, polypropylene glycol mono(meth)acrylate, 2-hydroxy-3-phenoxypropyl (meth)acrylate, 2-(meth)acryloyloxyethyl-2-hydroxyethyl phthalate, and hydroxyl-terminated lactone-modified (meth)acrylates. The radically polymerizable unsaturated monomers (x-4) having a functional group capable of reacting with an acid group may be used singly, or two or more may be used in combination.

Among the radically polymerizable unsaturated monomers (x-5) having a hydroxyl, isocyanate or glycidyl group, those having a hydroxyl group and those having a glycidyl group may be exemplified by the radically polymerizable unsaturated monomers having a hydroxyl group and the radically polymerizable unsaturated monomers having a glycidyl group which are mentioned hereinabove as examples of the radically polymerizable unsaturated monomers (x-4).

Examples of the radically polymerizable unsaturated monomers having an isocyanate group include 2-(meth) acryloyloxyethyl isocyanate, 2-(2-(meth)acryloyloxyethoxy)ethyl isocyanate, and 1,1-bis((meth)acryloyloxymethyl)ethyl isocyanate. The radically polymerizable unsaturated monomers (x-5) having a hydroxyl, isocyanate or glycidyl group may be used singly, or two or more may be used in combination.

Among the radically polymerizable unsaturated monomers (x-6) having a functional group capable of reacting with a hydroxyl, isocyanate or glycidyl group, those having a functional group capable of reacting with a hydroxyl group may be exemplified by the radically polymerizable unsaturated monomers having a carboxyl group, and the radically polymerizable unsaturated monomers having an isocyanate group which are mentioned hereinabove. The radically polymerizable unsaturated monomers having a functional group capable of reacting with an isocyanate group may be exemplified by the radically polymerizable unsaturated monomers having a hydroxyl group which are mentioned hereinabove. The radically polymerizable unsaturated monomers having a functional group capable of reacting with a glycidyl group may be exemplified by the radically polymerizable unsaturated monomers having a carboxyl group, and the radically polymerizable unsaturated monomers having a hydroxyl group which are mentioned hereinabove. The radically polymerizable unsaturated monomers (x-6) having a functional group capable of reacting with a hydroxyl, isocyanate or glycidyl group may be used singly, or two or more may be used in combination.

Examples of the base compounds (x-7) include amine compounds and inorganic base compounds.

Examples of the amine compounds include ammonia, primary amines, secondary amines and tertiary amines.

Examples of the primary amines include primary monoamines such as ethylamine, n-propylamine, sec-propylamine, n-butylamine, sec-butylamine, i-butylamine, tert-butylamine, pentylamine, hexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenethylamine, α-phenylethylamine, naphthylamine and furfurylamine; and primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl) ether, 1,2-bis-(3-aminopropoxy)ethane, 1,3-bis-(3-aminopropoxy)-2,2'-dimethylpropane, aminoethylethanolamine, 1,2-bisaminocyclohexane, 1,3-bisaminocyclohexane, 1,4-bisaminocyclohexane, 1,3-bisaminomethylcyclohexane, 1,4-bisaminomethylcyclohexane, 1,3-bisaminoethylcyclohexane, 1,4-bisaminoethylcyclohexane, 1,3-bisaminopropylcyclohexane, 1,4-bisaminopropylcyclohexane, hydrogenated 4,4'-diaminodiphenylmethane, 2-aminopiperidine, 4-aminopiperidine, 2-aminomethylpiperidine, 4-aminomethylpiperidine, 2-aminoethylpiperidine, 4-aminoethylpiperidine, N-aminoethylpiperidine, N-aminopropylpiperidine, N-aminoethylmorpholine, N-aminopropylmorpholine, isophoronediamine, menthanediamine, 1,4-bisaminopropylpiperazine, o-phenylenediamine, m-phenylenediamine, p-phenylenediamine, 2,4-tolylenediamine, 2,6-tolylenediamine, 2,4-toluenediamine, m-aminobenzylamine, 4-chloro-o-phenylenediamine, tetrachloro-p-xylylenediamine, 4-methoxy-6-methyl-m-phenylenediamine, m-xylylenediamine, p-xylylenediamine, 1,5-naphthalenediamine, 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenylsulfone, 4,4'-diaminoditolylsulfone, methylenebis(o-chloroaniline), 3,9-bis(3-aminopropyl) 2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, N-aminoethylpiperazine, N-aminopropylpiperazine, 1,4-bis(aminoethylpiperazine), 1,4-bis(aminopropylpiperazine), 2,6-diaminopyridine, and bis(3,4-diaminophenyl)sulfone.

Examples of the secondary amines include secondary monoamines such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, pyrrolidine, piperidine, 2,4-lupetidine, 2,6-lupetidine, 3,5-lupetidine, diphenylamine, N-methylaniline, N-ethylaniline, dibenzylamine, methylbenzylamine, dinaphthylamine, pyrrole, indoline, indole and morpholine; and secondary polyamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, and 1,4-di-(4-piperidyl)butane.

Examples of the tertiary amines include tertiary monoamines such as trimethylamine, triethylamine, tri-n-propylamine, tri-iso-propylamine, tri-1,2-dimethylpropylamine, tri-3-methoxypropylamine, tri-n-butylamine, tri-iso-butylamine, tri-sec-butylamine, tri-pentylamine, tri-3-pentylamine, tri-n-hexylamine, tri-n-octylamine, tri-2-ethylhexylamine, tri-dodecylamine, tri-laurylamine, dicyclohexylethylamine, cyclohexyldiethylamine, tri-cyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine, 2-(2-dimethylaminoethoxy)-4-methyl-1,3,2-dioxaborinane, and 2-, 3- and 4-picolines; and tertiary polyamines such as tetramethylethylenediamine, pyrazine, N,N'-dimethylpiperazine, N,N'-bis((2-hydroxy)propyl)piperazine, hexamethylenetetramine, N,N,N',N'-tetramethyl-1,3-butanamine, 2-dimethylamino-2-hydroxypropane, diethylaminoethanol, N,N,N-tris(3-dimethylaminopropyl)amine, 2,4,6-tris(N,N-dimethylaminomethyl)phenol, and heptamethylisobiguanide.

Examples of the inorganic base compounds include sodium hydroxide and potassium hydroxide.

Of the base compounds (x-7), amine compounds are preferable for the reasons that the fluorine-containing active energy ray curable resin that is obtained exhibits good solubility or dispersibility in the aqueous active energy ray curable resin composition of the invention, and cured films may be obtained with excellent leveling properties. Tertiary amines are more preferable, and N,N-dimethylethanolamine is still more preferable. The basic compounds (x-7) may be used singly, or two or more may be used in combination.

The copolymer (P1-1), the copolymer (P1-2), the copolymer (P1-3) and the copolymer (P1-4) may be obtained by, for example, polymerizing the comonomers in an organic solvent using a radical polymerization initiator.

Some preferred organic solvents are, for example, ketones, esters, amides, sulfoxides, ethers and hydrocarbons. Specific examples include acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethylsulfoxide, diethyl ether, diisopropyl ether, tetrahydrofuran, dioxane, toluene and xylene. The solvent may be selected appropriately in consideration of boiling point, compatibility and polymerizability.

Examples of the radical polymerization initiators include peroxides such as benzoyl peroxide, and azo compounds such as azobisisobutyronitrile. Where necessary, chain transfer agents such as lauryl mercaptan, 2-mercaptoethanol, thioglycerol, ethylthioglycolic acid and octylthioglycolic acid may be used.

To ensure that the final fluorine-containing active energy ray curable resin will have a large number of polymerizable unsaturated groups per molecule, the number average molecular weights (Mn) of the copolymer (P1-1), the copolymer (P1-2), the copolymer (P1-3) and the copolymer (P1-4) are preferably 800 to 10,000, and more preferably 1,000 to 5,000. The weight average molecular weights (Mw) are preferably 1,000 to 100,000, more preferably 2,000 to 50,000, and still more preferably 2,500 to 20,000.

The number average molecular weights (Mn) and the weight average molecular weights (Mw) are polystyrene equivalent values measured by gel permeation chromatography (hereinafter, abbreviated as "GPC"). The GPC measurement conditions are as follows.

[GPC Measurement Conditions]

Chromatograph: "HLC-8220 GPC" manufactured by TOSOH CORPORATION

Columns: Guard column "HHR-H" (6.0 mm I.D.×4 cm) manufactured by TOSOH CORPORATION+"TSK-GEL GMHHR-N" (7.8 mm I.D.×30 cm) manufactured by TOSOH CORPORATION+"TSK-GEL GMHHR-N" (7.8 mm I.D.×30 cm) manufactured by TOSOH CORPORATION+"TSK-GEL GMHHR-N" (7.8 mm I.D.×30 cm) manufactured by TOSOH CORPORATION+"TSK-GEL GMHHR-N" (7.8 mm I.D.×30 cm) manufactured by TOSOH CORPORATION Detector: ELSD ("ELSD 2000" manufactured by Alltech Japan)

Data processing: "GPC-8020 Model II Data Analysis Version 4.30" manufactured by TOSOH CORPORATION Measurement conditions:
Column temperature 40° C.
Developing solvent tetrahydrofuran (THF)
Flow rate 1.0 ml/min
Sample: A filtrate (5 µl) was obtained by filtering a 1.0 mass %, in terms of solid resin, tetrahydrofuran solution through a microfilter.
Standards: The following monodisperse polystyrenes having known molecular weights were used in accordance with Measurement Manual of "GPC-8020 Model II Data Analysis Version 4.30".
(Monodisperse Polystyrenes)
"A-500" manufactured by TOSOH CORPORATION
"A-1000" manufactured by TOSOH CORPORATION
"A-2500" manufactured by TOSOH CORPORATION
"A-5000" manufactured by TOSOH CORPORATION
"F-1" manufactured by TOSOH CORPORATION
"F-2" manufactured by TOSOH CORPORATION
"F-4" manufactured by TOSOH CORPORATION
"F-10" manufactured by TOSOH CORPORATION
"F-20" manufactured by TOSOH CORPORATION
"F-40" manufactured by TOSOH CORPORATION
"F-80" manufactured by TOSOH CORPORATION
"F-128" manufactured by TOSOH CORPORATION
"F-288" manufactured by TOSOH CORPORATION
"F-550" manufactured by TOSOH CORPORATION The amounts of acid groups (the acid values) in the copolymer (P1-1), the copolymer (P1-2), the copolymer (P1-3) and the copolymer (P1-4) are preferably 10 to 600 mg KOH/g, more preferably 20 to 500 mg KOH/g, and still more preferably 50 to 450 mg KOH/g for the reasons that a large number of neutral salt structures (a4) can be introduced through the acid groups, and the fluorine-containing active energy ray curable resin that is obtained attains excellent solubility or dispersibility in water.

When part of the acid groups present in the copolymer (P1-1) or (P1-3) are reacted with the radically polymerizable unsaturated monomer (x-4) having a functional group capable of reacting with the acid group, the reaction may be performed under conditions which do not induce the polymerization of the polymerizable unsaturated groups in the radically polymerizable unsaturated monomer. The same applies to when the hydroxyl, isocyanate or glycidyl groups present in the copolymer (P1-2) or (P1-4) are reacted with the radically polymerizable unsaturated monomer (x-6) having a functional group capable of reacting with these groups. For example, the reaction is preferably performed while controlling the temperature conditions to the range of 30 to 120° C. The reaction is preferably carried out in the presence of a catalyst and a polymerization inhibitor. An organic solvent may be used as required.

When the copolymer (P1-2) or the copolymer (P1-4) is a copolymer having a hydroxyl group, and when the functional group capable of reacting with the hydroxyl group is an isocyanate group, the reaction is preferably performed using p-methoxyphenol, hydroquinone, 2,6-di-t-butyl-4-methylphenol or the like as a polymerization inhibitor, under catalysis of a urethane-forming reaction catalyst such as dibutyltin dilaurate, dibutyltin diacetate, tin octylate or zinc octylate, at a reaction temperature of 40 to 120° C., in particular 60 to 90° C., to produce the copolymer (P2-2) or the copolymer (P2-4).

When the copolymer (P1-2) or the copolymer (P1-4) is a copolymer having a glycidyl group, and when the functional group capable of reacting with the glycidyl group is a carboxyl group, the reaction is preferably performed using p-methoxyphenol, hydroquinone, 2,6-di-t-butyl-4-methylphenol or the like as a polymerization inhibitor, under catalysis of an esterification reaction catalyst, for example, a tertiary amine such as triethylamine, a quaternary ammonium such as tetramethylammonium chloride, a tertiary phosphine such as triphenylphosphine, or a quaternary phosphonium such as tetrabutylphosphonium chloride, at a reaction temperature of 80 to 130° C., in particular 100 to 120° C., to produce the copolymer (P2-2) or the copolymer (P2-4).

When the copolymer (P1-2) or the copolymer (P1-4) is a copolymer having an isocyanate group, and when the functional group capable of reacting with the isocyanate group is a hydroxyl group, the reaction is preferably performed using p-methoxyphenol, hydroquinone, 2,6-di-t-butyl-4-methylphenol or the like as a polymerization inhibitor, under catalysis of a urethane-forming reaction catalyst such as dibutyltin dilaurate, dibutyltin diacetate, tin octylate or zinc octylate, at a reaction temperature of 40 to 120° C., in particular 60 to 90° C., to produce the copolymer (P2-2) or the copolymer (P2-4).

For the reason of simplicity, the fluorine-containing active energy ray curable resin of the invention is preferably obtained by the method (A1-1) or (A2-1). In this method, the fluorine-containing active energy ray curable resin that is obtained is more preferably a product of reaction between a copolymer (a fluorine-containing active energy ray curable resin) having an acid value of 10 to 600 mg KOH/g, and a base compound, the amount of the base compound used being 0.5 to 1.0 equivalent relative to the acid present in the fluorine-containing active energy ray curable resin. The fluorine-containing active energy ray curable resin thus obtained advantageously attains excellent solubility in water.

As already mentioned, the fluorine-containing active energy ray curable resins of the present invention preferably have an oxyalkylene chain as a side chain. Such a fluorine-containing active energy ray curable resin advantageously exhibits good solubility or dispersibility in an aqueous active energy ray curable resin composition, and cured films with excellent leveling properties can be obtained. For example, the fluorine-containing active energy ray curable resin having an oxyalkylene chain as a side chain may be obtained by using a radically polymerizable unsaturated monomer having an oxyalkylene chain in the production of the copolymer (P1-1), the copolymer (P1-2), the copolymer (P1-3) or the copolymer (P1-4).

Examples of the radically polymerizable unsaturated monomers having an oxyalkylene chain include polypropylene glycol mono(meth)acrylate, polyethylene glycol mono(meth)acrylate, polytetramethylene glycol (meth)acrylate, poly(ethylene glycol-propylene glycol) mono(meth)acrylate, polyethylene glycol-polypropylene glycol mono(meth)acrylate, poly(ethylene glycol-tetramethylene glycol) mono(meth)acrylate, polyethylene glycol-polytetramethylene glycol mono(meth)acrylate, poly(propylene glycol-tetramethylene glycol) mono(meth)acrylate, polypropylene glycol-polytetramethylene glycol mono(meth)acrylate, poly(propylene glycol-butylene glycol) mono(meth)acrylate, polypropylene glycol-polybutylene glycol mono(meth)acrylate, poly(ethylene glycol-butylene glycol) mono(meth)acrylate, polyethylene glycol-polybutylene glycol mono(meth)acrylate, poly(tetraethylene glycol-butylene glycol) mono(meth)acrylate, polytetraethylene glycol-polybutylene glycol mono(meth)acrylate, polybutylene glycol mono(meth)acrylate, poly(ethylene glycol-trimethylene glycol) mono(meth)acrylate, polyethylene glycol-polytrimethylene glycol mono(meth)acrylate, poly(propylene glycol-trimethylene glycol) mono(meth)acrylate, polypropylene glycol-polytrimethylene glycol mono(meth)acrylate, poly(trimethylene glycol-tetramethylene glycol) mono(meth)acrylate, polytrimethylene glycol-polytetramethylene glycol mono (meth)acrylate, poly(butylene glycol-trimethylene glycol) mono(meth)acrylate, and polybutylene glycol-polytrimethylene glycol mono(meth)acrylate. Here, "poly(ethylene glycol-propylene glycol)" means a random copolymer of ethylene glycol and propylene glycol, and "polyethylene glycol-polypropylene glycol" means a block copolymer of ethylene glycol and propylene glycol. The same applies to the rest of the examples. Of the radically polymerizable unsaturated monomers having an oxyalkylene chain, those having an oxyethylene chain are preferable, and polyethylene glycol mono (meth)acrylate is more preferable.

Example commercial products of the radically polymerizable unsaturated monomers having an oxyalkylene chain include "NK Ester M-20G", "NK Ester M-40G", "NK Ester M-90G", "NK Ester M-230G", "NK Ester AM-90G", "NK Ester AMP-10G", "NK Ester AMP-20G" and "NK Ester AMP-60G" manufactured by SHIN-NAKAMURA CHEMICAL CO., LTD., and "BLEMMER PE-90", "BLEMMER PE-200", "BLEMMER PE-350", "BLEMMER PME-100", "BLEMMER PME-200", "BLEMMER PME-400", "BLEMMER PME-4000", "BLEMMER PP-1000", "BLEMMER PP-500", "BLEMMER PP-800", "BLEMMER 70PEP-350B", "BLEMMER 55PET-800", "BLEMMER 50POEP-800B", "BLEMMER 10PPB-500B", "BLEMMER NKH-5050", "BLEMMER AP-400" and "BLEMMER AE-350" manufactured by NOF CORPORATION. The radically polymerizable unsaturated monomers having an oxyalkylene chain may be used singly, or two or more may be used in combination.

Further, the production of the fluorine-containing active energy ray curable resin of the invention may involve radically polymerizable unsaturated monomers other than the radically polymerizable unsaturated monomers described hereinabove, while still ensuring that the advantageous effects of the present invention are not impaired. Examples of such radically polymerizable unsaturated monomers include (meth)acrylate esters such as methyl (meth)acrylate, ethyl (meth)acrylate, n-propyl (meth)acrylate, n-butyl (meth)acrylate, isobutyl (meth)acrylate, n-pentyl (meth)acrylate, n-hexyl (meth)acrylate, n-heptyl (meth) acrylate, n-octyl (meth)acrylate, 2-ethylhexyl (meth) acrylate, nonyl (meth)acrylate, decyl (meth)acrylate, dodecyl (meth)acrylate, cyclohexyl (meth)acrylate and isobornyl (meth)acrylate; aromatic vinyls such as styrene, α-methylstyrene, p-methylstyrene and p-methoxystyrene; and maleimides such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide. These radically polymerizable unsaturated monomers may be used singly, or two or more may be used in combination.

The fluorine-containing active energy ray curable resin of the present invention obtained by the aforementioned method may be subjected to post treatment as required such as reprecipitation or concentration to remove the organic solvent in the reaction system, and thereafter water may be added to the resin to form a solution or a dispersion.

A surfactant of the present invention includes a polymer structure (a1) derived from a radically polymerizable unsaturated monomer, a poly(perfluoroalkylene ether) chain (a2), a radically polymerizable unsaturated group (a3), and an acid group forming a neutral salt structure (a4). By virtue of this configuration, the surfactant may be uniformly dispersed or dissolved in an aqueous composition and may impart good leveling properties and antifouling properties to cured films (cured products).

An active energy ray curable resin composition of the present invention includes the fluorine-containing active energy ray curable resin of the invention [hereinafter, this resin will be also written as the fluorine-containing active energy ray curable resin (A)], an active energy ray curable hydrophilic resin (B) other than the fluorine-containing active energy ray curable resins (A), and water.

Examples of the active energy ray curable hydrophilic resins (B) include those having a radically polymerizable group and a hydrophilic functional group. Examples of the radically polymerizable groups include (meth)acryloyl group, vinyl group and allyl group. In particular, (meth) acryloyl group is preferable because the resin exhibits excellent photocurability, and cured films that are obtained attain a sufficient degree of photocuring.

Examples of the hydrophilic functional groups include carboxyl group, sulfonic group, phosphoric group and polyoxyethylene chain. Carboxyl group and polyoxyethylene chain are preferable as the hydrophilic functional groups for the reason that the active energy ray curable hydrophilic resin (B) may be obtained by easy and simple synthesis from easily available raw materials.

Specific examples of the active energy ray curable hydrophilic resins (B) include hydrophilic epoxy resins having a radically polymerizable unsaturated group, and hydrophilic (meth)acrylic resins having a radically polymerizable unsaturated group.

For example, the hydrophilic epoxy resin may be obtained by reacting an epoxy resin with a radically polymerizable unsaturated monomer having a functional group capable of reacting with the epoxy group in the epoxy resin, and thereafter further reacting the epoxy resin with a compound having a hydrophilic group and a functional group capable of reacting with the epoxy group in the epoxy resin.

Examples of the epoxy resins include bisphenol A epoxy resins, bisphenol F epoxy resins, bisphenol S epoxy resins, bisphenol AD epoxy resins, resorcin epoxy resins, hydroquinone epoxy resins, catechol epoxy resins, dihydroxynaphthalene epoxy resins, biphenyl epoxy resins and tetramethylbiphenyl epoxy resins.

Examples of the radically polymerizable unsaturated monomers having a functional group capable of reacting with the epoxy group include (meth)acrylic acid and β-carboxyethyl acrylate.

Examples of the compounds having a hydrophilic group and a functional group capable of reacting with the epoxy group include polycarboxylic acids and polycarboxylic anhydrides such as phthalic acid and phthalic anhydride; sulfonic acid and phosphoric acid.

Examples of the hydrophilic (meth)acrylic resins having a radically polymerizable organic group include reaction products of a hydroxyl-containing acrylic resin, a polyisocyanate compound and a hydroxyl-containing radically polymerizable unsaturated monomer.

For the reason that the resin exhibits excellent hydrophilicity, a preferred example of such reaction products is one which is obtained from a copolymer (b4), a polyisocyanate compound (b5) and a hydroxyl-containing radically polymerizable unsaturated monomer (b6), the copolymer (b4) being composed of a polyoxyalkylene-containing radically polymerizable unsaturated monomer (b1), a hydroxyl-containing radically polymerizable unsaturated monomer (b2) other than the acrylic monomers (b1), and a radically polymerizable unsaturated monomer (b3) other than the radically polymerizable unsaturated monomers (b1) and the radically polymerizable unsaturated monomers (b2) [hereinafter, this reaction product will be sometimes written as the "active energy ray curable hydrophilic resin (B1)"]. This reaction product will be described in detail below.

The copolymer (b4) is a copolymer obtained from, as essential raw materials, a polyoxyalkylene-containing radically polymerizable unsaturated monomer (b1), a hydroxyl-containing radically polymerizable unsaturated monomer (b2), and a radically polymerizable unsaturated monomer (b3) other than the radically polymerizable unsaturated monomers (b1) and the radically polymerizable unsaturated monomers (b2).

Examples of the radically polymerizable unsaturated monomers (b1) include compounds having a polyoxyalkylene group and a (meth)acryloyl group. Examples of the polyoxyalkylene groups include polyoxyethylene group, polyoxypropylene group and polyoxybutylene group.

For example, the radically polymerizable unsaturated monomer (b1) may be represented by the following general formula (b-1).

[Chem. 8]

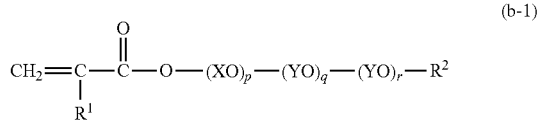

(b-1)

(In the formula, $R^1$ is a hydrogen atom or a methyl group, X, Y and Z are each independently an alkylene group, p, q and r are each an integer of 0, or 1 or more, the total of p, q and r is an integer of 1 or greater, and $R_2$ is a hydrogen atom, a C1-C6 alkyl group or a phenyl group.)

In the general formula (b-1), X, Y and Z are alkylene groups. Examples of the alkylene groups include ethylene group, propylene group and butylene group. The alkylene groups may have substituents.

In the general formula (b-1), p, q and r represent the numbers of the oxyalkylene groups that are repeated. For the reasons that enhanced water dispersibility is obtained and the active energy ray curable resin composition that is obtained attains enhanced storage stability, the total of these numbers is preferably 4 to 100, more preferably 6 to 50, and still more preferably 8 to 25. The repeating units having X, the repeating units having Y, and the repeating units having Z may be present randomly or may form respective blocks.

In the general formula (1), $R^2$ is a hydrogen atom, a C1-C6 alkyl group or a phenyl group. When $R^2$ is hydrogen, the radically polymerizable unsaturated monomer (b1) is a mono(meth)acrylate ester of a polyalkylene glycol such as polyethylene glycol, polypropylene glycol or polybutylene glycol. When $R^2$ is a C1-C6 alkyl group or a phenyl group, the radically polymerizable unsaturated monomer is such that the end of the alkylene glycol mono(meth)acrylate ester opposite to the (meth)acryloyl group is capped with the C1-C6 alkyl group or the phenyl group. For the reasons that enhanced water dispersibility is obtained and the active energy ray curable resin composition that is obtained attains enhanced storage stability, $R^2$ is preferably a C1-C3 alkyl group, and more preferably a methyl group.

Examples of the radically polymerizable unsaturated monomers (b1) include polyethylene glycol (meth)acrylate, methoxypolyethylene glycol (meth)acrylate, ethoxypolyethylene glycol (meth)acrylate, propoxypolyethylene glycol (meth)acrylate, butoxypolyethylene glycol (meth)acrylate, phenoxypolyethylene glycol (meth)acrylate, polypropylene glycol (meth)acrylate, methoxypolypropylene glycol (meth)acrylate, ethoxypolypropylene glycol (meth)acrylate, propoxypolypropylene glycol (meth)acrylate, butoxypolypropylene glycol (meth)acrylate, phenoxypolypropylene glycol (meth)acrylate, polybutylene glycol (meth)acrylate, methoxypolybutylene glycol (meth)acrylate, ethoxypolybutylene glycol (meth)acrylate, propoxypolybutylene glycol (meth)acrylate, butoxypolybutylene glycol (meth)acrylate, phenoxypolybutylene glycol (meth)acrylate, polyethylene glycol-polypropylene glycol (meth)acrylate, methoxypolyethylene glycol-polypropylene glycol (meth)acrylate, phenoxypolyethylene glycol-polypropylene glycol (meth)acrylate, polyethylene glycol-polybutylene glycol (meth)acrylate, methoxypolyethylene glycol-polybutylene glycol (meth)acrylate, and phenoxypolyethylene glycol-polybutylene glycol (meth)acrylate. Of the radically polymerizable unsaturated monomers (b1), those having a polyoxyethylene group are preferable because the acrylic resin (B1) attains good dispersibility in the aqueous medium. The radically polymerizable unsaturated monomers (b1) may be used singly, or two or more may be used in combination.

The radically polymerizable unsaturated monomer (b2) is a compound which does not belong to the radically polymerizable unsaturated monomers (b1) and has a hydroxyl group and a (meth)acryloyl group. Specific examples of the radically polymerizable unsaturated monomers (b2) include 2-hydroxyethyl (meth)acrylate, 3-hydroxypropyl (meth)acrylate, 4-hydroxy-n-butyl (meth)acrylate, 2-hydroxypropyl (meth)acrylate, 2-hydroxy-n-butyl (meth)acrylate, 3-hydroxy-n-butyl (meth)acrylate, 1,4-cyclohexanedimethanol mono(meth)acrylate, N-(2-hydroxyethyl) (meth)acrylamide, glycerol mono(meth)acrylate, polyethylene glycol mono(meth)acrylate, polypropylene glycol mono(meth)acrylate, 2-hydroxy-3-phenoxypropyl (meth)acrylate, 2-(meth)acryloyloxyethyl-2-hydroxyethyl phthalate, and hydroxyl-terminated lactone-modified (meth)acrylates. The radically polymerizable unsaturated monomers (b2) may be used singly, or two or more may be used in combination.

The radically polymerizable unsaturated monomer (b3) is a radically polymerizable unsaturated monomer other than the radically polymerizable unsaturated monomers (b1) and (b2). Examples of the radically polymerizable unsaturated monomers (b3) include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, n-hexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, cetyl (meth)acrylate, stearyl (meth)acrylate, behenyl (meth)acrylate, cyclohexyl (meth)acrylate, 4-tert-butylcyclohexyl (meth)acrylate, isobornyl (meth)acrylate, dicyclopentanyl (meth)acrylate, benzyl (meth)acrylate, acrylamide, N,N-dimethyl(meth)acrylamide, (meth)acrylonitrile, 3-(meth)acryloylpropyltrimethoxysilane, N,N-dimethylaminoethyl (meth)acrylate, and glycidyl (meth)acrylate. Of the radically polymerizable unsaturated monomers (b3), aliphatic or alicyclic acrylic monomers are preferable because the active energy ray curable resin composition that is obtained attains still enhanced storage stability. Alicyclic radically polymerizable unsaturated monomers are more preferable. The radically polymerizable unsaturated monomers (b3) may be used singly, or two or more may be used in combination.

The raw materials for the copolymer (b4) may include an additional monomer other than the radically polymerizable unsaturated monomers (b1), the radically polymerizable unsaturated monomers (b2) and the radically polymerizable unsaturated monomers (b3). Examples of such additional monomers include aromatic vinyl monomers such as styrene, a-methylstyrene, p-methylstyrene and p-methoxystyrene.

For the reasons that enhanced water dispersibility is obtained and the active energy ray curable resin composition that is obtained attains enhanced storage stability, the amount of the radically polymerizable unsaturated monomer (b1) is preferably in the range of 30 to 80 mass %, and more preferably in the range of 40 to 70 mass % relative to the total mass of the monomer components for forming the copolymer (b4). For the reasons that enhanced water dispersibility is obtained and the active energy ray curable resin composition that is obtained attains enhanced storage stability, the amount of the radically polymerizable unsaturated monomer (b2) is preferably in the range of 2 to 30 mass %, more preferably in the range of 3 to 25 mass %, and still more preferably in the range of 5 to 20 mass % relative to the total mass of the monomer components for forming the copolymer (b4). The amount of the radically polymerizable unsaturated monomer (b3) and the optional additional monomer is the balance after deduction of the proportions of the radically polymerizable unsaturated monomer (b1) and the radically polymerizable unsaturated monomer (b2) from 100 mass % of all the monomer components for forming the copolymer (b4).

For example, the copolymer (b4) may be produced by copolymerizing the radically polymerizable unsaturated monomers (b1) to (b3) and optionally the additional monomer in an organic solvent using a polymerization initiator. Some preferred organic solvents for use herein are, for example, alcohol compounds, ketone compounds, ester compounds, ether compounds, amide compounds, sulfoxide compounds and hydrocarbon compounds. Specific examples include methanol, ethanol, propanol, n-butanol, iso-butanol, tert-butanol, 3-methoxybutanol, acetone, methyl ethyl ketone, methyl isobutyl ketone, cyclohexanone, ethyl acetate, butyl acetate, propylene glycol monomethyl ether acetate, diisopropyl ether, ethylene glycol monomethyl ether, ethylene glycol monoethyl ether, ethylene glycol monobutyl ether, ethylene glycol dimethyl ether, diethylene glycol dimethyl ether, diethylene glycol diethyl ether, diethylene glycol dibutyl ether, propylene glycol monomethyl ether, propylene glycol monopropyl ether, propylene glycol monobutyl ether, propylene glycol dimethyl ether, dipropylene glycol monomethyl ether, dipropylene glycol dimethyl ether, dimethylformamide, dimethylacetamide, N-methylpyrrolidone, dimethylsulfoxide, tetrahydrofuran, dioxane, toluene and xylene. For the reason that the active energy ray curable resin composition that is obtained attains enhanced storage stability, dialkylene glycol dialkyl ethers such as diethylene glycol dimethyl ether, diethylene glycol diethyl ether and dipropylene glycol dimethyl ether are more preferable.

Examples of the polymerization initiators include organic peroxides, for example, ketone peroxide compounds such as cyclohexanone peroxide, 3,3,5-trimethylcyclohexanone peroxide and methylcyclohexanone peroxide; peroxyketal compounds such as 1,1-bis(tert-butylperoxy)-3,3,5-trimethylcyclohexane, 1,1-bis(tert-butylperoxy)cyclohexane, n-butyl-4,4-bis(tert-butylperoxy)valerate, 2,2-bis(4,4-di-tert-butylperoxycyclohexyl)propane, 2,2-bis(4,4-di-tert-amylperoxycyclohexyl)propane, 2,2-bis(4,4-di-tert-hexylperoxycyclohexyl)propane, 2,2-bis(4,4-di-tert-octylperoxycyclohexyl)propane and 2,2-bis(4,4-dicumylperoxycyclohexyl)propane; hydroperoxides such as cumenehydroperoxide and 2,5-dimethylhexane-2,5-dihydroperoxide; dialkyl peroxide compounds such as 1,3-bis(tert-butylperoxy-m-isopropyl)benzene, 2,5-dimethyl-2,5-di(tert-butylperoxy)hexane, diisopropylbenzene peroxide and tert-butylcumyl peroxide; diacyl peroxide compounds such as decanoyl peroxide, lauroyl peroxide, benzoyl peroxide and 2,4-dichlorobenzoyl peroxide; peroxycarbonate compounds such as bis(tert-butylcyclohexyl) peroxydicarbonate; and peroxy ester compounds such as tert-butyl peroxy-2-ethylhexanoate, tert-butyl peroxybenzoate and 2,5-dimethyl-2,5-di(benzoylperoxy)hexane; and azo compounds such as 2,2'-azobisisobutyronitrile and 1,1'-azobis(cyclohexane-1-carbonitrile).

Where necessary, the production of the copolymer (b4) may involve a chain transfer agent such as lauryl mercaptan, 2-mercaptoethanol, thioglycerol, ethylthioglycolic acid or octylthioglycolic acid.

For the reasons that enhanced water dispersibility is obtained and the active energy ray curable resin composition that is obtained attains enhanced storage stability, the hydroxyl value of the copolymer (b4) is preferably in the range of 5 to 130 mg KOH/g, more preferably in the range of 10 to 100 mg KOH/g, and still more preferably in the range of 15 to 80 mg KOH/g.

For the reasons that enhanced water dispersibility is obtained and the active energy ray curable resin composition that is obtained attains enhanced storage stability, the weight average molecular weight (Mw) of the copolymer (b4) is preferably in the range of 3,000 to 100,000, more preferably in the range of 4,000 to 50,000, and still more preferably in the range of 5,000 to 30,000.

Examples of the polyisocyanate compounds (b5) include aromatic diisocyanate compounds such as tolylene diisocyanate, diphenylmethane diisocyanate, m-xylylene diisocyanate and m-phenylenebis(dimethylmethylene) diisocyanate; and aliphatic or alicyclic diisocyanate compounds such as hexamethylene diisocyanate, lysine diisocyanate, 1,3-bis(isocyanatomethyl)cyclohexane, 2-methyl-1,3-diisocyanatocyclohexane, 2-methyl-1,5-diisocyanatocyclohexane, 4,4'-dicyclohexylmethane diisocyanate and isophorone diisocyanate. Of these, aliphatic or alicyclic diisocyanate compounds are preferable because excellent yellowing resistance is obtained.

Examples of the polyisocyanate compounds (b5) further include prepolymers having isocyanate groups which are obtained by the addition reaction of the above diisocyanate compound with a polyhydric alcohol; compounds having an isocyanurate ring which are obtained by the cyclization trimerization of the above diisocyanate compound; polyisocyanate compounds having a urea bond or a biuret bond which are obtained by the reaction of the above diisocyanate compound with water; homopolymers of radically polymerizable unsaturated monomers having an isocyanate group such as 2-isocyanatoethyl (meth)acrylate, 3-isopropenyl-α, α-dimethylbenzyl isocyanate and (meth)acryloyl isocyanate; and copolymers having isocyanate groups which are obtained by the copolymerization of the above radically polymerizable unsaturated monomers having an isocyanate group, with comonomers such as other radically polymerizable unsaturated monomers, vinyl ester compounds, vinyl ether compounds, aromatic vinyl monomers and fluoroolefins. The polyisocyanate compounds (b5) may be used singly, or two or more may be used in combination.

The hydroxyl-containing radically polymerizable unsaturated monomer (b6) is a compound which has a hydroxyl group, and a (meth)acryloyl group as a radically polymerizable unsaturated group. Examples of the radically polymerizable unsaturated monomers (b6) include hydroxyl-containing monofunctional (meth)acrylates such as 2-hydroxyethyl (meth)acrylate, 3-hydroxypropyl (meth) acrylate, 4-hydroxy-n-butyl (meth)acrylate, 2-hydroxypropyl (meth)acrylate, 2-hydroxy-n-butyl (meth)acrylate, 3-hydroxy-n-butyl (meth)acrylate, 1,4-cyclohexanedimethanol mono(meth)acrylate, N-(2-hydroxyethyl) (meth)acrylamide, glycerol mono(meth)acrylate, polyethylene glycol mono (meth)acrylate, polypropylene glycol mono(meth)acrylate, 2-hydroxy-3-phenoxypropyl (meth)acrylate, 2-(meth)acryloyloxyethyl-2-hydroxyethyl phthalate, and hydroxyl-terminated lactone-modified (meth)acrylates; and hydroxyl-containing polyfunctional (meth)acrylates such as trimethylolpropane di(meth)acrylate, pentaerythritol tri (meth)acrylate, and dipentaerythritol penta(meth)acrylate. The radically polymerizable unsaturated monomers (b6) may be used singly, or two or more may be used in combination.

Of the radically polymerizable unsaturated monomers (b6), pentaerythritol triacrylate is preferable for the reasons that it has a low viscosity and is easy to handle, and that the active energy ray curable resin composition that is obtained can give cured films with enhanced surface hardness.

For example, the copolymer (b4), the polyisocyanate compound (b5) and the radically polymerizable unsaturated monomer (b6) may be reacted in such a manner that the copolymer (b4), the polyisocyanate compound (b5) and the radically polymerizable unsaturated monomer (b6) are reacted together at the same time, that the polyisocyanate compound (b5) and the radically polymerizable unsaturated monomer (b6) are reacted to each other, and thereafter the product is reacted with the copolymer (b4), or that the copolymer (b4) and the polyisocyanate compound (b5) are reacted to each other, and thereafter the product is reacted with the radically polymerizable unsaturated monomer (b6). However, the manner of reaction is not limited to those described above.

The reaction of the copolymer (b4), the polyisocyanate compound (b5) and the radically polymerizable unsaturated monomer (b6) may be carried out without a catalyst, but is preferably performed in the presence of a urethane-forming catalyst in order to promote the reaction. Examples of the urethane-forming catalysts include amine compounds such as pyridine, pyrrole, triethylamine, diethylamine and dibutylamine; phosphine compounds such as triphenylphosphine and triethylphosphine; and organometallic compounds such as organotin compounds including dibutyltin dilaurate, octyltin trilaurate, octyltin diacetate, dibutyltin diacetate and tin octylate, and zinc octylate. Of the urethane-forming catalysts, dibutyltin dilaurate is preferable.

For the reasons that enhanced water dispersibility is obtained and the active energy ray curable resin composition that is obtained attains enhanced storage stability, the mass ratio [(b4)/(b6)] of the copolymer (b4) to the radically polymerizable unsaturated monomer (b6) is preferably in the range of 0.2 to 8.0, more preferably in the range of 0.3 to 4.5, and still more preferably in the range of 0.5 to 2.5.

For the reasons that enhanced water dispersibility is obtained and the active energy ray curable resin composition that is obtained attains enhanced storage stability, the copolymer (b4), the polyisocyanate compound (b5) and the radically polymerizable unsaturated monomer (b6) are preferably used in such amounts that the total number of moles of the hydroxyl groups in the copolymer (b4) and the hydroxyl groups in the radically polymerizable unsaturated monomer (b6) is in the range of 0.2 to 1.2, and more preferably in the range of 0.4 to 1.0 per 1 mol of the isocyanate groups in the polyisocyanate compound (b5).

When an organic solvent is present in the reaction of the copolymer (b4), the polyisocyanate compound (b5) and the radically polymerizable unsaturated monomer (b6), and if the organic solvent is reactive with the polyisocyanate compound (b5), it is preferable that such a solvent be removed beforehand.

To ensure that the fluorine-containing active energy ray curable resin (A) will attain excellent compatibility with other resins in the active energy ray curable resin composition of the present invention, and the composition will give films with excellent antifouling properties, the content of the resin (A) in the composition is preferably 0.001 to 10 parts by mass based on 100 parts by mass of the nonvolatile components, and is more preferably 0.01 to 3 parts by mass, and still more preferably 0.1 to 1 part by mass. To ensure that the composition will have a low viscosity and exhibit excellent coating properties, the content of the active energy ray curable hydrophilic resin (B) in the active energy ray curable resin composition of the present invention is preferably 10 to 50 parts by mass, and more preferably 20 to 40 parts by mass based on 100 parts by mass of the nonvolatile components.

The active energy ray curable resin composition of the present invention usually contains a polymerization initiator. Examples of the polymerization initiators include benzophenone, acetophenone, benzoin, benzoin ethyl ether, benzoin isobutyl ether, benzyl methyl ketal, azobisisobutyronitrile, 1-hydroxycyclohexyl phenyl ketone, 2-hydroxy-2-methyl-1-phenyl-1-one, 1-(4'-isopropylphenyl)-2-hydroxy-2-methylpropan-1-one, 1-(4'-dodecylphenyl)-2-hydroxy-2-methylpropan-1-one, 3,3',4,4'-tetra(t-butylperoxycarbonyl) benzophenone, 4,4"-diethylisophthalophene, 2,2-dimethoxy-1,2-diphenylethan-1-one, benzoin isopropyl ether, thioxanthone, 2-chlorothioxanthone, 2-methylthioxanthone, 2-isopropylthioxanthone, 2-methyl-1-[4-(methylthio)phenyl]-2-morpholinopropan-1-one, 2-benzyl-2-dimethylamino-1-(4-morpholinophenyl)-butanone-1, bis(2,6-dimethoxybenzoyl)-2,4,4-trimethyl-pentylphosphine oxide, bis(2,4,6-trimethylbenzoyl)-phenylphosphine oxide, and 2,4,6-trimethylbenzoyldiphenylphosphine oxide. The polymerization initiators may be used singly, or two or more may be used in combination.

Where necessary, photosensitizers such as amine compounds and phosphorus compounds may be added to promote the photopolymerization.

The content of the polymerization initiator in the active energy ray curable resin composition of the present invention is preferably in the range of 0.01 to 15 parts by mass, and more preferably in the range of 0.3 to 7 parts by mass relative to 100 parts by mass of the total of the fluorine-containing active energy ray curable resin (A) and the active energy ray curable hydrophilic resin (B).

The active energy ray curable resin composition of the present invention may contain additives such as fillers, dispersants, surfactants other than the fluorine-containing active energy ray curable resins of the invention, and hydrophilic solvents while still achieving the advantageous effects of the present invention.

Examples of the hydrophilic solvents include tetrahydrofuran, dioxane, dimethylformamide, N-methylpyrrolidone, dimethylsulfoxide, methanol, ethanol, propanol, ethylene glycol, propylene glycol, ethylene glycol monomethyl ether, ethylene glycol dimethyl ether, propylene glycol methyl ether, diethylene glycol monomethyl ether, and diethylene glycol dimethyl ether.

A cured film of the present invention is one obtained by curing the active energy ray curable resin composition of the present invention. The film thickness of the cured film is, for example, 1 to 300 μm, and may be 10 to 250 μm or 15 to 200 μm.

In the production of the cured film of the present invention, the active energy ray curable resin composition may be applied by various methods depending on the use applications. Examples of the coating methods or tools include gravure coaters, roll coaters, comma coaters, knife coaters, air knife coaters, curtain coaters, kiss coaters, shower coaters, wheel coaters, spin coaters, dipping, screen printing, spraying, applicators, bar coaters, air spraying, airless spraying, rollers, texture guns, universal guns, brushes, and electrostatic coating.

After being applied, the active energy ray curable resin composition is usually dried. The drying may be performed at an elevated temperature or room temperature. After being dried, the film is irradiated with an active energy ray to give a cured film of the present invention. The active energy rays are ionizing radiations such as ultraviolet light, electron beam, α-ray, β-ray and γ-ray. Specific examples of the energy sources or curing devices include germicidal lamps, ultraviolet fluorescent lamps, carbon arcs, xenon lamps, high-pressure mercury lamps for copying machines, medium-pressure or high-pressure mercury lamps, ultra-high-pressure mercury lamps, electrodeless lamps, metal halide lamps, ultraviolet light from natural light or other light sources, and electron beams generated by a scanning or curtain type electron beam accelerator.

As already described, the fluorine-containing active energy ray curable resin of the present invention may be suitably used as a surfactant in an aqueous active energy ray curable resin composition. The active energy ray curable resin composition of the present invention can give cured films with excellent leveling properties and antifouling properties even without containing an organic solvent, and may be used as a coating material in various use applications. By virtue of such excellent characteristics, the active energy ray curable resin compositions of the present invention may be suitably used as, among others, hardcoat materials for liquid crystal display polarizer protective films and touch panel protective films such as TAC films; hardcoat agents for liquid crystal displays and organic EL displays in mobile phones, smartphones, televisions, digital cameras and game machines; hardcoat agents for chassises of electrical appliances such as mobile phones, smartphones, personal computers, televisions, refrigerators, washing machines, air conditioners, digital cameras and game machines; optical lens coating agents; paints, inks or black resists for black matrixes used in liquid crystal display color filters; paints for interior materials in various vehicles such as automobiles and railway vehicles, and for leathers such as artificial leathers and synthetic leathers, FRP products such as FRP bathtubs, various building materials such as decorative plates, and wood materials such as furniture; optical fiber cladding materials; waveguides; liquid crystal sealants; various optical sealing materials; and optical adhesives.

EXAMPLES

Hereinbelow, the present invention will be described in further detail based on EXAMPLES. In EXAMPLES, parts and % are on mass basis unless otherwise mentioned.

SYNTHETIC EXAMPLE 1 [Synthesis of active energy ray curable hydrophilic resin (B)]

A four-necked flask equipped with a stirrer, a thermometer, a condenser and a nitrogen inlet tube was charged with 300 g of methyl ethyl ketone, and the temperature was increased to 75° C. under a stream of nitrogen. Thereafter, a mixture liquid containing 325 g of methoxypolyethylene glycol acrylate ("AM-130G" manufactured by SHIN-NAKAMURA CHEMICAL CO., LTD., average number of oxyethylene units per molecule: not more than 13), 75 g of 2-hydroxyethyl methacrylate, 241 g of isobornyl acrylate, 11 g of 2,2'-azobis(2,4-dimethylvaleronitrile) ("ABN-V" manufactured by Japan Finechem Inc.) and 47 g of methyl ethyl ketone was added dropwise over a period of 5 hours. After the completion of the dropwise addition, the reaction was performed at 75° C. for 3 hours. A solution (65 mass % resin) was thus obtained which contained a polymer (b4) having a weight average molecular weight of 11,500 and a hydroxyl value of 50.

A four-necked flask equipped with a stirrer, a thermometer and a condenser was charged with 160 g of the 65 mass % polymer (b4) solution obtained in SYNTHETIC EXAMPLE, 0.2 g of methoquinone, 0.1 g of dibutyltin dilaurate, 251 g of a mixture of pentaerythritol triacrylate and pentaerythritol tetraacrylate ("ARONIX M-305" manufactured by TOAGOSEI CO., LTD.) and 67 g of isophorone diisocyanate. The temperature was increased to 75° C., and the mixture was stirred at the temperature for 8 hours. The disappearance of the absorption by isocyanate groups at 2250 cm$^{-1}$ was confirmed based on an infrared spectrum, and the reaction was terminated. Next, the reaction liquid was cooled to 30° C., and 520 g of ion exchange water was added. The mixture was stirred. The organic solvent component methyl ethyl ketone was distilled away under reduced pressure. An aqueous dispersion of an active energy ray curable aqueous resin composition (W-1) was thus obtained.

Example 1 (Fluorine-Containing Active Energy Ray Curable Resin)

A glass flask equipped with a stirrer, a thermometer, a condenser and a dropping device was charged with 150 g of hydroxyl-terminated perfluoropolyether compound represented by the following formula (a1):

[Chem. 9]

HO—CH$_2$-PFPE-CH$_2$—OH     (a1)

(in the formula, PFPE indicates perfluoromethylene groups and perfluoroethylene groups, and the average number of the perfluoromethylene groups per molecule is 19 and that of the perfluoroethylene groups is 19), 68 g of p-chloromethylstyrene, 0.05 g of p-methoxyphenol, 44 g of a 50 mass % aqueous solution of benzyltriethylammonium chloride, and 0.12 g of potassium iodide. Next, stirring was started under a stream of air, and the temperature inside the flask was increased to 45° C. 1.3 g of a 49 mass % aqueous solution of sodium hydroxide was added dropwise over a period of 2 hours. After the completion of the dropwise addition, the temperature was increased to 60° C., and stirring was performed for 1 hour. Thereafter, 11.5 parts by mass of a 49 mass % aqueous solution of sodium hydroxide was added dropwise over a period of 4 hours, and the reaction was performed for another 15 hours.

After the completion of the reaction, the salt formed was separated by filtration. The filtrate was allowed to stand, and the supernatant was removed. Further, 500 mL of water was added to the filtrate to wash the same. This water washing operation was performed 3 times. After the water washing, 500 mL of methanol was added to the filtrate to wash the same. The salt was washed with methanol 3 times.

After the washing, 0.06 g and 0.2 g of p-methoxyphenol and 3,5-t-dibutyl-4-hydroxytoluene, respectively, as polymerization inhibitors were added to the filtrate. Thereafter, the methanol was distilled away while concentrating the liquid using a water bath set at 45° C. and a rotary evaporator. Thus, a radically polymerizable unsaturated monomer (X1) of the following formula (A1) was obtained which had a poly(perfluoroalkylene ether) chain and styryl groups at both ends of the chain.

[Chem. 10]

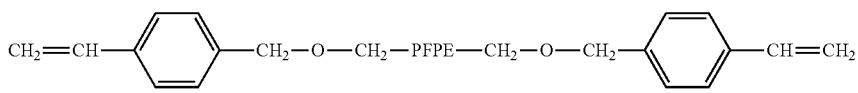

(A1)

(In the formula, PFPE indicates perfluoromethylene groups and perfluoroethylene groups, and the average number of the perfluoromethylene groups per molecule is 19 and that of the perfluoroethylene groups is 19.)

A glass flask equipped with a stirrer, a thermometer, a condenser and dropping devices was charged with 100 g of propylene glycol monomethyl ether as a solvent. While performing stirring under a stream of nitrogen, the temperature was increased to 105° C. Next, three kinds of liquids were set in the respective dropping devices. One of the liquids was 20 g of the radically polymerizable unsaturated monomer (X1), the second was a solution of 40 g of polyethylene glycol monoacrylate (the number of ethylene repeating units: 9) and 40 g of methacrylic acid in 150 parts by mass of propylene glycol monomethyl ether, and the third was a polymerization initiator solution containing 15 g of t-butylperoxy-2-ethyl hexanoate as a radical polymerization initiator in 50 g of propylene glycol monomethyl ether. The liquids were added dropwise into the flask concurrently over a period of 2 hours while keeping the temperature inside the flask at 105° C. After the completion of the dropwise addition, stirring was performed at 105° C. for 10 hours. Thus, a solution of a polymer (P-1) was obtained.

Next, the solid content of the polymer (P-1) solution obtained above was adjusted to 60%, and 0.1 g of p-methoxyphenol as a polymerization inhibitor was added. Stirring was started under a stream of air, and the temperature was increased. When the temperature reached 80° C., 39 g of 4-hydroxybutyl acrylate glycidyl ether and 0.4 g of triphenylphosphine as a catalyst were added. The temperature was further increased to 110° C., and stirring was performed at 110° C. for 10 hours. A solution of a polymer (P-2) was thus obtained.

Part of the solvent of the polymer (P-2) solution was distilled away under reduced pressure. A 90% polymer (P-2) solution was thus obtained. The polymer (P-2) had a weight average molecular weight Mw of 6,400 and an acid value of 95 mg KOH/g. Next, 1.5 g (1.0 equivalent) of dimethylethanolamine and 15 g of water were added to 10 g of the 90% polymer (P-2) solution. The mixture was stirred at 25° C. for 1 hour and was diluted with water. A 20% aqueous solution containing a fluorine-containing active energy ray curable resin (1) of the invention was thus obtained.

Comparative Example 1 (Comparative Fluorine-Containing Active Energy Ray Curable Resin)

A glass flask equipped with a stirrer, a thermometer, a condenser and dropping devices was charged with 73.1 g of 1,3-bis(trifluoromethyl)benzene as a solvent. While performing stirring under a stream of nitrogen, the temperature was increased to 105° C. Next, three kinds of liquids were set in the respective dropping devices. One of the liquids was 41.8 g of the radically polymerizable unsaturated monomer (X1), the second was 80 g of 2-hydroxyethyl methacrylate, and the third was a polymerization initiator solution containing 18.3 g of t-butylperoxy-2-ethyl hexanoate as a radical polymerization initiator in 153.1 g of 1,3-bis(trifluoromethyl)benzene. The liquids were added dropwise into the flask concurrently over a period of 2 hours while keeping the temperature inside the flask at 105° C. After the completion of the dropwise addition, stirring was performed at 105° C. for 10 hours. Thus, a solution of a polymer (P'-1) was obtained.

Next, 0.08 g of p-methoxyphenol as a polymerization inhibitor, and 0.06 g of tin octylate as a urethane-forming catalyst were added to the polymer (P'-1) solution obtained above. Stirring was started under a stream of air. While keeping the temperature at 60° C., 85 g of 2-acryloyloxyethyl isocyanate was added dropwise over a period of 1 hour. After the completion of the dropwise addition, the reaction was performed while performing stirring at 60° C. for 1 hour and stirring at 80° C. for 5 hours. The disappearance of the absorption peak assigned to isocyanate groups was confirmed by IR spectrometry. Next, the solids in the reaction solution were removed by filtration, and part of the solvent was distilled away under reduced pressure. A 50% 1,3-bis(trifluoromethyl)benzene solution of a comparative fluorine-containing active energy curable resin (1') was obtained. The comparative fluorine-containing active energy curable resin (1') had a weight average molecular weight of 3,300.

Comparative Example 2 (Comparative Fluorine-Containing Active Energy Non-Curable Resin)

1.5 g of dimethylethanolamine was added to 10 g of the polymer (P-1) solution. The mixture was stirred at 25° C. for 1 hour, and was diluted with water. A 20% aqueous solution containing a comparative fluorine-containing active energy non-curable resin (2') was thus obtained.

Example 2 (Active Energy Ray Curable Resin Composition)

100 Parts of the aqueous solution of the active energy ray curable hydrophilic resin (B1) was mixed together with 1.6 parts of photopolymerization initiator "IRGACURE 500" manufactured by Ciba Specialty Chemicals to give a solution as a base composition of an active energy ray curable composition.

1 Part, in terms of resin, of the fluorine-containing active energy ray curable resin (1) was admixed with 100 parts of the base composition. An active energy ray curable resin composition (1) of the invention was thus obtained. Next, the active energy ray curable resin composition (1) was applied to a glass substrate with use of an applicator so that the dry film thickness would be 20 μm. The coating was dried in a 25° C. dryer for 10 minutes and in an 80° C. dryer for 10 minutes to volatilize the solvent. A dry film was thus obtained.

Next, the dry film was irradiated with ultraviolet light (UV) using a UV curing device (air atmosphere, high-pressure mercury lamp, 8 kJ/m$^2$ UV dose) and was thereby cured into a cured film. The leveling properties and antifouling properties of the cured film were evaluated by the following methods. The evaluation results are described in Table 1.

Method for Evaluating Leveling Properties of Cured Film

The cured film was visually observed to evaluate the leveling properties of the cured film based on the following criteria.

<Criteria for Evaluating Leveling Properties>

A: The film was smooth and free from unevenness.

B: The film was slightly uneven.

C: The product was so uneven and did not qualify as a film.

Method for Evaluating Antifouling Properties of Cured Film

The contact angles of water and n-dodecane on the cured film, and the fouling resistance of the cured film were evaluated in the following manners.

D: The ink was not repelled at all, and a clean line was drawn on the surface.

Comparative Example 3 (Comparative Active Energy Ray Curable Resin Composition)

A comparative active energy ray curable resin composition (1') was obtained in the same manner as in EXAMPLE 2, except that the fluorine-containing active energy ray curable resin (1) was replaced by the comparative fluorine-containing active energy curable resin (1'). A cured film was formed from the composition and was evaluated in the similar manners as in EXAMPLE 2. The results are described in Table 1.

Comparative Example 4 (Same as Above)

A comparative active energy ray non-curable resin composition (2') was obtained in the same manner as in EXAMPLE 2, except that the fluorine-containing active energy ray curable resin (1) was replaced by the comparative fluorine-containing active energy non-curable resin (2'). A cured film was formed from the composition and was evaluated in the similar manners as in EXAMPLE 2. The results are described in Table 1.

Comparative Example (Same as Above)

A comparative active energy ray curable resin composition (3') was obtained in the same manner as in EXAMPLE 2, except that the active energy ray curable resin composition (1) was replaced by 100 parts of the base composition used in EXAMPLE 2. A cured film was formed from the composition and was evaluated in the similar manners as in EXAMPLE 2. The results are described in Table 1.

TABLE 1

|  |  | EXAMPLE | COMPARATIVE EXAMPLES | | |
| --- | --- | --- | --- | --- | --- |
|  |  | 2 | 3 | 4 | 5 |
| Active energy ray curable resin composition |  |  |  |  |  |
| Fluorine-containing active energy ray curable resin |  | (1) | (1') | (2') | None |
| Leveling properties |  | A | C | A | B |
| Contact angles | Water | 99 | NM | 98 | 75 |
|  | n-Dodecane | 44 | NM | 42 | 9 |
| Fouling resistance |  | A | NM | C | D |

Remarks in TABLE 1
NM: Not measured due to unevenness.

<Measurement of Contact Angles of Water and n-Dodecane>

The contact angles of water and n-dodecane were measured with a contact angle meter ("MODEL DM-701" manufactured by Kyowa Interface Science, Inc.).

<Evaluation of Fouling Resistance>

On the surface of the cured film, a line was drawn with a felt-tip pen ("MAGIC INK LARGE BLUE" manufactured by Teranishi Chemical Industry Co., Ltd.), and the condition of the blue ink sitting on the surface was visually observed to evaluate the fouling resistance. The evaluation criteria were as follows.

A: The cured film showed the highest level of antifouling properties, and rejected the ink as droplets.

B: Although the ink was not rejected as droplets, the width of the ink line was less than 50% of the width of the tip of the felt-tip pen as a result of repelling.

C: The ink was repelled in a linear form, and the width of the ink line was 50% to less than 100% of the width of the tip of the felt-tip pen.

The invention claimed is:

1. A fluorine-containing active energy ray curable and water-soluble resin comprising a polymer structure (a1) derived from a radically polymerizable unsaturated monomer, a poly(perfluoroalkylene ether) chain (a2), a radically polymerizable unsaturated group (a3), and an acid group forming a neutral salt structure (a4);

wherein the total number of fluorine atoms in a single poly(perfluoroalkylene ether) chain (a2) is in the range of 18 to 200.

2. The fluorine-containing active energy ray curable and water-soluble resin according to claim 1, wherein a plurality of the polymer structures (a1) derived from a radically polymerizable unsaturated monomer are connected through the poly(perfluoroalkylene ether) chain (a2), and the radically polymerizable unsaturated group (a3) and the acid group forming a neutral salt structure (a4) are present as side chains in the polymer structures (a1).

3. The fluorine-containing active energy ray curable and water-soluble resin according to claim 1, wherein the acid group forming a neutral salt structure (a4) is an acid group forming an amine salt structure.

4. The fluorine-containing active energy ray curable and water-soluble resin according to claim 3, wherein the acid group forming an amine salt structure is a carboxyl group forming an amine salt structure.

5. The fluorine-containing active energy ray curable and water-soluble resin according to claim 3, wherein the acid group forming an amine salt structure is a carboxyl group forming a salt structure with a tertiary amine.

6. The fluorine-containing active energy ray curable and water-soluble resin according to claim 5, wherein the tertiary amine is N,N-dimethylethanolamine.

7. The fluorine-containing active energy ray curable and water-soluble resin according to claim 1, which is a product of reaction between: a fluorine-containing active energy ray curable resin which comprises a polymer structure (a1) derived from a radically polymerizable unsaturated monomer, a poly(perfluoroalkylene ether) chain (a2) and a radically polymerizable unsaturated group (a3), and which has an acid value of 10 to 600 mg KOH/g; and a base compound, the amount of the base compound used being 0.5 to 1.0 equivalent relative to the acid present in the fluorine-containing active energy ray curable resin.

8. The fluorine-containing active energy ray curable and water-soluble resin according to claim 2, wherein the polymer structure (a1) and the poly(perfluoroalkylene ether) chain (a2) are connected to each other via a structure derived from a styryl group.

9. The fluorine-containing active energy ray curable and water-soluble resin according to claim 1, which further has an oxyalkylene chain as a side chain of the polymer structure (a1).

10. The fluorine-containing active energy ray curable and water-soluble resin according to claim 9, wherein the oxyalkylene chain comprises an oxyethylene chain.

11. The fluorine-containing active energy ray curable and water-soluble resin according to claim 1, wherein the poly (perfluoroalkylene ether) chain (a2) includes a perfluoromethylene ether chain and a perfluoroethylene ether chain.

12. A surfactant comprising a polymer structure (a1) derived from a radically polymerizable unsaturated monomer, a poly(perfluoroalkylene ether) chain (a2), a radically polymerizable unsaturated group (a3), and an acid group forming a neutral salt structure (a4).

13. An active energy ray curable resin composition comprising the fluorine-containing active energy ray curable and water-soluble resin (A) described in claim 1, an active energy ray curable hydrophilic resin (B) other than the fluorine-containing active energy ray curable resin (A), and water.

14. The active energy ray curable resin composition according to claim 13, wherein the content of the fluorine-containing active energy ray curable and water-soluble resin (A) is 0.001 to 10 parts by mass based on 100 parts by mass of nonvolatile components in the composition.

15. A cured film of the active energy ray curable resin composition described in claim 13.

\* \* \* \* \*